US008363755B2

(12) United States Patent
Houchi et al.

(10) Patent No.: US 8,363,755 B2
(45) Date of Patent: Jan. 29, 2013

(54) SIGNAL RECEIVING APPARATUS, METHOD, PROGRAM AND SYSTEM

(75) Inventors: Suguru Houchi, Tokyo (JP); Naoki Yoshimochi, Kanagawa (JP); Takuya Okamoto, Chiba (JP); Yuken Goto, Tokyo (JP); Takashi Yokokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 323 days.

(21) Appl. No.: 12/788,398

(22) Filed: May 27, 2010

(65) Prior Publication Data

US 2010/0310013 A1 Dec. 9, 2010

(30) Foreign Application Priority Data

Jun. 4, 2009 (JP) ................ P2009-134666

(51) Int. Cl.
*H04L 27/00* (2006.01)

(52) U.S. Cl. ........ 375/324; 375/316; 375/260; 375/259; 375/285; 375/346; 375/349; 375/347; 375/267

(58) Field of Classification Search .................. 375/316, 375/260, 259, 285, 346, 349, 347, 267
See application file for complete search history.

(56) References Cited

U.S. PATENT DOCUMENTS

| 5,844,636 | A  | * | 12/1998 | Joseph et al. | ............ | 375/240.26 |
| 5,996,103 | A  | * | 11/1999 | Jahanghir | ..................... | 714/755 |
| 8,111,743 | B2 | * | 2/2012 | Imamura | ....................... | 375/232 |
| 2006/0039507 | A1 | * | 2/2006 | Lee | ............................... | 375/326 |
| 2006/0251183 | A1 |   | 11/2006 | Soffer | | |
| 2007/0280098 | A1 | * | 12/2007 | Bhatt et al. | .................... | 370/208 |
| 2009/0175370 | A1 | * | 7/2009 | Kuroda et al. | ................ | 375/260 |

FOREIGN PATENT DOCUMENTS

GB 2 449 470 11/2008

OTHER PUBLICATIONS

Digital Video Broadcasting (DVB); "Frame Structure Channel Coding and Modulation for a Second Generation Digital Terrestrial Television Broadcasting System (DVB-T2)", ETSI EN 302 755, v1.1.1 (Sep. 2009), DVB Document A122 Jun. 2008.

* cited by examiner

*Primary Examiner* — Siu Lee
(74) *Attorney, Agent, or Firm* — Frommer Lawrence & Haug LLP; William S. Frommer; Ellen Marcie Emas

(57) ABSTRACT

A signal receiving apparatus includes: an acquisition section configured to acquire an Orthogonal Frequency Division Multiplexing signal resulting from combination of a plurality of signals transmitted by a plurality of signal transmitting apparatus by adoption of an Orthogonal Frequency Division Multiplexing method; and a demodulation section configured to carry out partial processing of processing to demodulate the Orthogonal Frequency Division Multiplexing signal acquired by the acquisition section by making use of either first pilot signals or second pilot signals where the first pilot signals are pilot signals extracted from the Orthogonal Frequency Division Multiplexing signal acquired by the acquisition section as signals having the same phase for all the signal transmitting apparatus, and the second pilot signals are pilot signals extracted from the Orthogonal Frequency Division Multiplexing signal acquired by the acquisition section as signals having different phases depending on the signal transmitting apparatus.

12 Claims, 18 Drawing Sheets

SIGNAL RECEIVING APPARATUS, METHOD, PROGRAM AND SYSTEM

BACKGROUND OF THE INVENTION

1. Field of the Invention

The present invention relates to a signal receiving apparatus, a signal receiving method adopted by the apparatus, a signal receiving program implementing the method and a signal receiving system employing the apparatus. To put it more specifically, the present invention relates to a signal receiving apparatus capable of efficiently demodulating a signal transmitted by adoption of a MISO (Multi Input Single Output) method and relates to a signal receiving method adopted by the apparatus, a signal receiving program implementing the method as well as a signal receiving system employing the apparatus.

2. Description of the Related Art

In recent years, there has been used a modulation method referred to as an OFDM (Orthogonal Frequency Division Multiplexing) method as a method for transmitting a digital signal. The OFDM method is a method for carrying out digital modulation based on a PSK (Phase Shift Keying) technique or a QAM (Quadrature Amplitude Modulation) technique by which a number of orthogonal subcarriers are prepared in the transmission band and data is allocated to the amplitude and phase of each of the subcarriers. An OFDM time area signal is transmitted in symbol units each referred to as an OFDM symbol.

There are a number of cases in which the OFDM method is applied to terrestrial wave digital broadcasting much affected by multipath obstacles. There are specifications for the terrestrial wave digital broadcasting based on the OFDM method. Typical examples of such specifications are the DVB-T (Digital Video Broadcasting-Terrestrial) and the ISDB-T (Integrated Services Digital Broadcasting-Terrestrial).

By referring to a block diagram of FIG. 1, the following description explains a typical configuration of a signal receiving apparatus 1 for receiving a signal modulated by adoption of the OFDM method.

The typical configuration of the signal receiving apparatus 1 shown in the block diagram of FIG. 1 includes an antenna 11, an AD (Analog-to-Digital) conversion section 12, an FFT (Fast Fourier Transform) section 13, an equalization section 14 and an error correction section 15.

The antenna 11 receives a digital broadcast signal transmitted by a signal transmitting apparatus 2 for example installed in a broadcast station and supplies the signal to the FFT section 13 by way of the AD conversion section 12. In accordance with a trigger-position command received from the equalization section 14, the FFT section 13 carries out an FFT calculation and supplies a signal obtained as a result of the FFT calculation to the equalization section 14.

The equalization section 14 extracts an SP (Scattered Pilot) signal from the signal obtained as a result of the FFT calculation and finds the profile of a transmission line between the signal receiving apparatus 1 and the signal transmitting apparatus 2 as well as other information by making use of the SP signal in order to carry out signal demodulation processing. The profile of a transmission line is the characteristic of the transmission line. To be more specific, the profile of a transmission line shows a response to an impulse input in a time region of the transmission line.

The SP signal is a scattered pilot signal used by the signal receiving apparatus 1 for inferring the transmission-line characteristic which is the frequency characteristic of the transmission line. As symbols forming an OFDM transmission frame, there are SP signals in addition to data carriers for conveying data. That is to say, each SP signal is also assigned to a carrier.

FIG. 2 is a diagram showing a typical signal-location pattern of SP signals among OFDM symbols. Each of FIGS. 3 and 4 is a diagram showing a typical signal-location pattern obtained as a result of a time interpolation process carried out by making use of SP signals existing among the OFDM symbols shown in the diagram of FIG. 2. FIG. 5 is a diagram showing a typical signal-location pattern obtained as a result of a spatial interpolation process carried out on SP signals existing among the OFDM symbols shown in the diagram of FIG. 2. It is to be noted that, in each of the diagrams of FIGS. 2 to 5, the horizontal axis represents carriers of OFDM signals whereas the vertical axis represents OFDM symbols of the OFDM signals. A carrier number is assigned to every carrier whereas a symbol number is assigned to each symbol even though neither the carrier numbers nor the symbol numbers are shown in the diagrams. The carriers correspond to the frequency whereas the symbols correspond to the time.

In each of the signal-location patterns shown in the diagrams of FIGS. 2 to 5, every circle represents an OFDM symbol. A white circle indicates (a carrier of) data serving as the subject of transmission. In some cases, the data includes a TMCC (Transmission and Multiplexing Configuration Control) pilot signal and an AC pilot signal. On the other hand, a black circle indicates an SP signal. In each of the signal-location patterns shown in the diagrams of FIGS. 3 to 5, each densely hatched circle indicates data obtained as a result of a time interpolation process carried out by making use of SP signals. In the following description, the data obtained as a result of a time interpolation process carried out by making use of SP signals is referred to as a time-interpolation SP. In the diagram of FIG. 5, every dashed-line circle indicates data obtained as a result of a frequency interpolation process carried out by making use of time-interpolation SPs which include SP signals. In the following description, the data obtained as a result of a frequency interpolation process carried out by making use of time-interpolation SPs is referred to as a frequency-interpolation SP.

The SP signal is a complex vector which has a known amplitude and a known phase. For example, in an OFDM transmission frame, an SP signal is provided for every 3 carriers. A data carrier for conveying data serving as the subject of the transmission is provided between SP signals. The signal receiving apparatus 1 receives an SP signal in a state of being distorted due to the effect of the characteristic of the transmission line. The SP signal prevailing at the signal receiving time is compared with an SP signal known at the signal transmitting time in order to obtain the transmission-line characteristic at the position of the SP signal.

On the basis of characteristics exhibited by the transmission line at the positions of the SP signals, the equalization section 14 carries out an interpolation process in the time direction of carriers, among which SP signals are located, for every symbol. The characteristic exhibited by the transmission line at the position of an SP signal has been obtained as a result of comparing the SP signal with an SP signal known at the signal transmitting time. As a result of the interpolation process carried out in the time direction, the equalization section 14 generates time-interpolation SPs. Each of the generated time-interpolation SPs is indicated by a densely hatched circle shown in the diagram of FIG. 3. The equalization section 14 then compares the data shown in the diagram of FIG. 2 as data at the signal receiving time with the time-interpolation SPs shown in the diagram of FIG. 3 in order to infer the characteristic of the transmission line for each symbol. As a result, for all symbols, the characteristic of the transmission line is, inferred for every 3 carriers laid out in the frequency direction, and a transmission-line profile showing the inferred characteristic of the transmission line is derived from the characteristic of the transmission line. The profile of a transmission line is used in processing such as a process of finding a trigger position of an FFT calculation.

Then, the equalization section 14 makes use of the time-interpolation SPs including SP signals in order to carry out an interpolation process in the frequency direction as shown in the diagram of FIG. 4. That is to say, the equalization section 14 implements a frequency-interpolation filter at every candidate center position for the time-interpolation SPs including SP signals in order to generate frequency-interpolation SPs. Then, the equalization section 14 compares the frequency-interpolation SPs with signals known at the signal transmitting time in order to find an optimum center position of a frequency-interpolation filter. A typical example of the known signals compared with the frequency-interpolation SPs is TMCC pilot signals.

Then, at the optimum center position, the equalization section 14 implements a frequency-interpolation filter in order to carry out an interpolation process in the frequency direction for the time-interpolation SPs including SP signals. As a result of the interpolation process carried out in the frequency direction, the equalization section 14 generates frequency-interpolation SPs as shown in the diagram of FIG. 5. In this way, a channel characteristic is inferred. The channel characteristic is the characteristic of the transmission line in the frequency direction of all carriers. Subsequently, the equalization section 14 divides a signal obtained as a result of an FFT calculation carried out by the FFT section by the channel characteristic in order to carry out an equalization process on a signal received from the signal transmitting apparatus 2. Finally, the equalization section 14 supplies a signal obtained as a result of the equalization process to the error correction section 15.

The reader is suggested to refer back to the block diagram of FIG. 1. The error correction section 15 carries out de-interleave processing on a signal interleaved by the signal transmitting apparatus 2 in order to generate a TS (Transport Stream) of decoded data which is obtained as a result of processes which include a de-puncture process, a Viterbi decoding process, a scattered-signal elimination process and an RS (Reed Solomon) decoding process. Then, the error correction section 15 supplies the resulting decoded data to for example an output section provided at a later stage shown in none of the figures.

By the way, in May 2009, the ETSI (European Telecommunication Standard Institute) was formulating DVB (Digital Video Broadcasting)-T.2 as the standards of the terrestrial digital broadcasting of the next generation. For more information on these standards, the reader is suggested to refer to DVB BlueBook A122 Rev. 1, Frame structure channel coding and modulation for a second generation digital terrestrial television broadcasting system (DVB-T.2), Sep. 1, 2008, DVB home page, search on May 18, 2009 at an Internet address <URL: http://www.dvb.org/technology/standards/>.

SUMMARY OF THE INVENTION

In accordance with the DVB-T.2 standards, each of an SISO (Single Input, Single Output) method and a MISO (Multiple Input, Single Output) method is adopted as a method for transmitting and receiving digital signals. Much like the existing method, the SISO method is a method for making use of a signal receiving antenna to receive a signal transmitted by a signal transmitting antenna. On the other hand, the MISO method is a method for making use of a signal receiving antenna to receive signals transmitted by 2 signal transmitting antennas. The MISO method is adopted for the first time in the DVB-T.2 standards.

Thus, at the present time, efficient demodulation is demanded in the MISO method.

In order to meet the demand for efficient demodulation, inventors of an embodiment of the present invention have innovated a signal receiving apparatus capable of efficiently demodulating a signal transmitted by adoption of the MISO method, a signal receiving method adopted by the apparatus, a signal receiving program implementing the method and a signal receiving system employing the apparatus.

A signal receiving apparatus according to a first embodiment of the present invention includes: acquisition means for acquiring an Orthogonal Frequency Division Multiplexing signal resulting from combination of a plurality of signals transmitted by a plurality of signal transmitting apparatus by adoption of an Orthogonal Frequency Division Multiplexing method; and demodulation means for carrying out partial processing of processing to demodulate the Orthogonal Frequency Division Multiplexing signal acquired by the acquisition means by making use of either first pilot signals or second pilot signals. The first pilot signals are pilot signals extracted from the Orthogonal Frequency Division Multiplexing signal acquired by the acquisition means as signals having the same phase for all the signal transmitting apparatus, and the second pilot signals are pilot signals extracted from the Orthogonal Frequency Division Multiplexing signal acquired by the acquisition means as signals having different phases depending on the signal transmitting apparatus.

The second pilot signals are pilot signals with phases reversed to each other among a plurality of signal transmitting apparatus.

It is possible to provide a configuration in which the demodulation means carries out the partial processing of the processing to demodulate the Orthogonal Frequency Division Multiplexing signal by making use of the first pilot signals.

It is also possible to provide a configuration in which the demodulation means has symbol synchronization means for carrying out the partial processing of the processing to demodulate the Orthogonal Frequency Division Multiplexing signal acquired by the acquisition means by performing processing to find a trigger position of an FFT (Fast Fourier Transform) calculation to be executed on a specific signal included in a predetermined segment of the Orthogonal Frequency Division Multiplexing signal.

It is also possible to provide a configuration in which the demodulation means has filter center-position search means for carrying out the partial processing of the processing to demodulate the Orthogonal Frequency Division Multiplexing signal by performing processing to find a center position of a frequency-interpolation filter.

It is also possible to provide a configuration in which the demodulation means has equalization means for carrying out the partial processing of the processing to demodulate the Orthogonal Frequency Division Multiplexing signal acquired by the acquisition means by performing equalization processing on the Orthogonal Frequency Division Multiplexing signal by making use of the first and second pilot signals.

A signal receiving method according to the first embodiment of the invention has the steps of driving a signal receiving apparatus to: acquire an Orthogonal Frequency Division Multiplexing signal resulting from combination of a plurality of signals transmitted by a plurality of signal transmitting apparatus by adoption of an Orthogonal Frequency Division Multiplexing method; and carry out partial processing of processing to demodulate the Orthogonal Frequency Division Multiplexing signal acquired by the signal receiving apparatus by making use of either first pilot signals or second pilot signals. The first pilot signals are pilot signals extracted from the Orthogonal Frequency Division Multiplexing signal acquired by the signal receiving apparatus as signals having the same phase for all the signal transmitting apparatus, and the second pilot signals are pilot signals extracted from the Orthogonal Frequency Division Multiplexing signal acquired by the signal receiving apparatus as signals having different phases depending on the signal transmitting apparatus.

A signal receiving program according to the first embodiment of the present invention to be executed by a computer which functions as: acquisition means for acquiring an Orthogonal Frequency Division Multiplexing signal resulting from combination of a plurality of signals transmitted by a plurality of signal transmitting apparatus by adoption of an Orthogonal Frequency Division Multiplexing method; and demodulation means for carrying out partial processing of processing to demodulate the Orthogonal Frequency Division Multiplexing signal acquired by the acquisition means by making use of either first pilot signals or second pilot signals. The first pilot signals are pilot signals extracted from the Orthogonal Frequency Division Multiplexing signal acquired by the acquisition means as signals having the same phase for all the signal transmitting apparatus, and the second pilot signals are pilot signals extracted from the Orthogonal Frequency Division Multiplexing signal acquired by the acquisition means as signals having different phases depending on the signal transmitting apparatus.

A signal receiving system according to a second embodiment of the present invention includes: acquisition means for acquiring a signal arriving through a transmission line; and a transmission-line signal decode processing section configured to carry out transmission-line signal decode processing including at least demodulation processing executed on the signal acquired by the acquisition means through the transmission line. The signal acquired by the acquisition means through the transmission line is an Orthogonal Frequency Division Multiplexing signal resulting from combination of a plurality of signals transmitted by a plurality of signal transmitting apparatus by adoption of an Orthogonal Frequency Division Multiplexing method through a plurality of the transmission lines. The transmission-line signal decode processing section employs demodulation means for carrying out partial processing of the demodulation processing to demodulate the Orthogonal Frequency Division Multiplexing signal acquired by the acquisition means through the transmission lines by making use of either first pilot signals or second pilot signals. The first pilot signals are pilot signals extracted from the Orthogonal Frequency Division Multiplexing signal acquired by the acquisition means as signals having the same phase for all the signal transmitting apparatus, and the second pilot signals are pilot signals extracted from the Orthogonal Frequency Division Multiplexing signal acquired by the acquisition means as signals having different phases depending on the signal transmitting apparatus.

A signal receiving system according to a third embodiment of the present invention includes: a transmission-line signal decode processing section configured to carry out transmission-line signal decode processing including at least demodulation processing executed on a signal acquired through a transmission line; and an original-information decode processing section configured to carry out original-information decode processing including at least processing to decompress compressed information into original information for the signal acquired through the transmission line signal decode processing. The signal acquired by the acquisition means through the transmission line is an Orthogonal Frequency Division Multiplexing signal resulting from combination of a plurality of signals transmitted by a plurality of signal transmitting apparatus by adoption of a Orthogonal Frequency Division Multiplexing method through a plurality of the transmission lines. The transmission-line signal decode processing section employs demodulation means for carrying out partial processing of the demodulation processing to demodulate the Orthogonal Frequency Division Multiplexing signal acquired through the transmission lines by making use of either first pilot signals or second pilot signals. The first pilot signals are pilot signals extracted from the Orthogonal Frequency Division Multiplexing signal acquired by the acquisition means as signals having the same phase for all the signal transmitting apparatus, and the second pilot signals are pilot signals extracted from the Orthogonal Frequency Division Multiplexing signal acquired by the acquisition means as signals having different phases depending on the signal transmitting apparatus.

A signal receiving system according to a fourth embodiment of the present invention includes: a transmission-line signal decode processing section configured to carry out transmission-line signal decode processing including at least demodulation processing executed on a signal acquired through a transmission line; and an output section configured to output an image or a sound on the basis of a signal obtained as a result of the transmission-line signal decode processing. The signal acquired by the acquisition means through the transmission line is an Orthogonal Frequency Division Multiplexing signal resulting from combination of a plurality of signals transmitted by a plurality of signal transmitting apparatus by adoption of an Orthogonal Frequency Division Multiplexing method through a plurality of the transmission lines. The transmission-line signal decode processing section employs demodulation means for carrying out partial processing of the demodulation processing to demodulate the Orthogonal Frequency Division Multiplexing signal acquired through the transmission lines by making use of either first pilot signals or second pilot signals. The first pilot signals are pilot signals extracted from the Orthogonal Frequency Division Multiplexing signal acquired by the acquisition means as signals having the same phase for all the signal transmitting apparatus, and the second pilot signals are pilot signals extracted from the Orthogonal Frequency Division Multiplexing signal acquired by the acquisition means as signals having different phases depending on the signal transmitting apparatus.

A signal receiving system according to a fifth embodiment of the present invention includes: a transmission-line signal decode processing section configured to carry out transmission-line signal decode processing including at least demodulation processing executed on a signal acquired through a transmission line; and a recording section used for recording a signal obtained as a result of the transmission-line signal decode processing. The signal acquired by the acquisition means through the transmission line is an Orthogonal Frequency Division Multiplexing signal resulting from combination of a plurality of signals transmitted by a plurality of signal transmitting apparatus by adoption of an Orthogonal Frequency Division Multiplexing method through a plurality of the transmission lines. The transmission-line signal decode processing section employs demodulation means for carrying out partial processing of the demodulation processing to demodulate the Orthogonal Frequency Division Multiplexing signal acquired through the transmission lines by making use of either first pilot signals or second pilot signals. The first pilot signals are pilot signals extracted from the Orthogonal Frequency Division Multiplexing signal acquired by the acquisition means as signals having the same phase for all the signal transmitting apparatus, and the second pilot signals are pilot signals extracted from the Orthogonal Frequency Division Multiplexing signal acquired by the acquisition means as signals having different phases depending on the signal transmitting apparatus.

As described above, in the first to fifth embodiments of the present invention, it is possible to obtain an OFDM signal resulting from combination of a plurality of signals transmitted by a plurality of signal transmitting apparatus by adoption of the OFDM method through a plurality of transmission lines. Then, either first pilot signals or second pilot signals are used to carry out partial processing of processing to demodulate the OFDM signal where: the first pilot signals are pilot signals extracted from the OFDM signal acquired by the acquisition section as signals having the same phase for all the signal transmitting apparatus; and the second pilot signals are pilot signals extracted from the OFDM signal acquired by the acquisition section as signals having different phases depending on the signal transmitting apparatus.

The signal receiving apparatus can be an independent apparatus or an internal block included in the configuration of a larger apparatus.

The signal receiving program is provided to the signal receiving apparatus by transmitting the program to the signal receiving apparatus through a transmission medium or provided to the signal receiving apparatus as a program recorded in a recording medium.

As described above, in accordance with the present embodiment, it is possible to demodulate signals received from a plurality of signal transmitting apparatus which each transmit one of the signals by adoption of the MISO method. In addition, in accordance with the present embodiment, it is possible to efficiently demodulate signals received from a plurality of signal transmitting apparatus which each transmit one of the signals by adoption of the MISO method.

DETAILED DESCRIPTION OF THE PREFERRED EMBODIMENT

Typical Configuration of the Signal Receiving Apparatus

Figure 1:
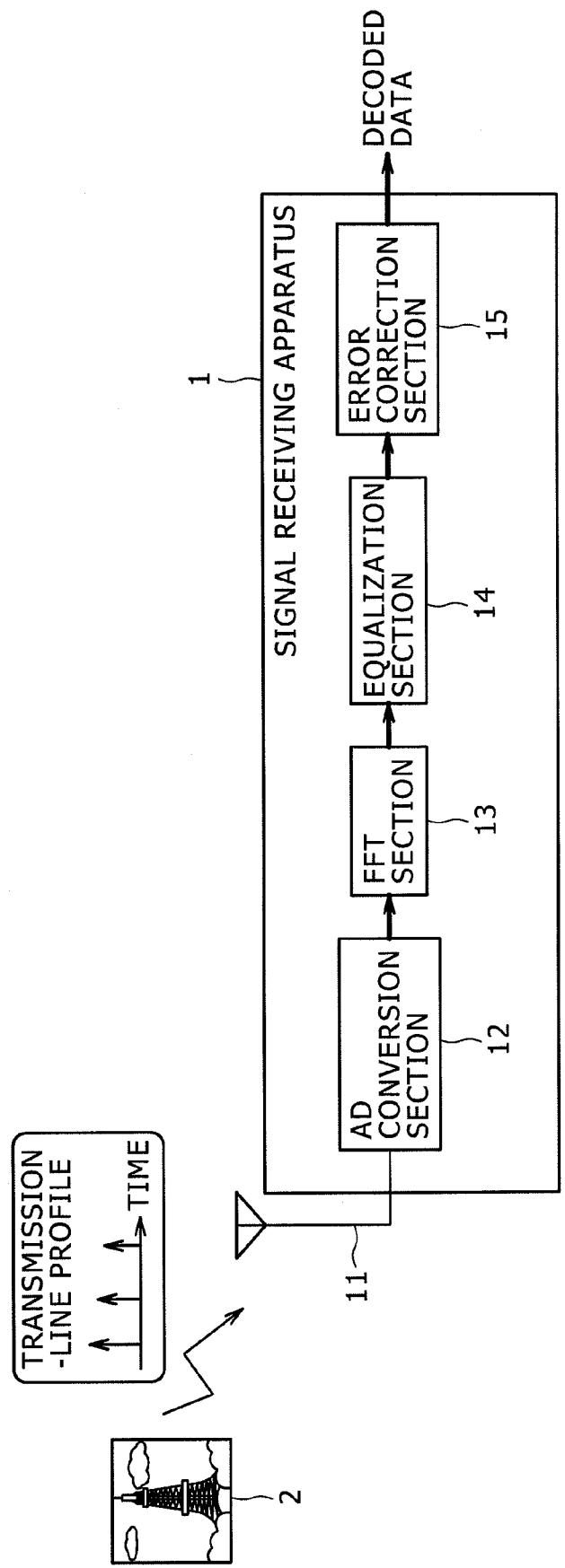
FIG. 1 is a block diagram showing a typical configuration of the existing signal receiving apparatus.
Figure 2:
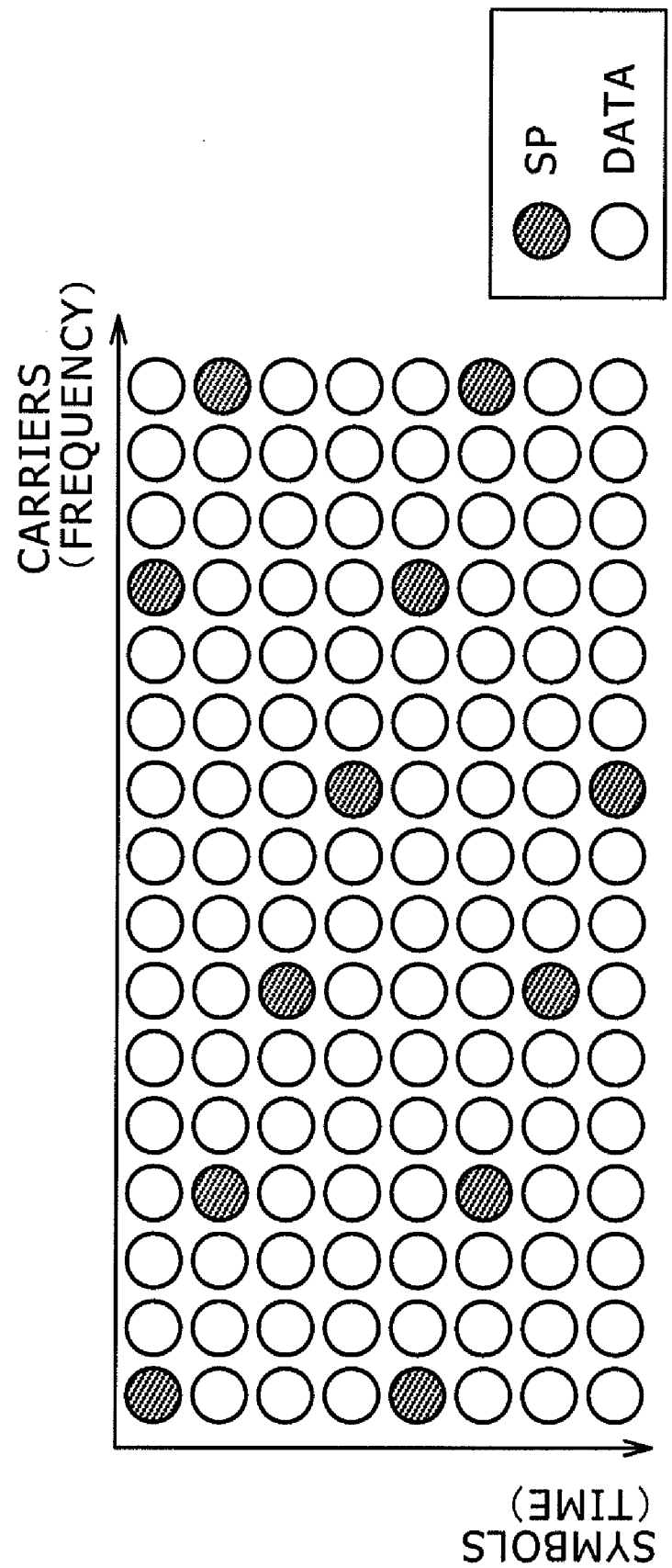
FIG. 2 is a diagram showing a typical signal-location pattern of SP signals among OFDM symbols.
Figure 3:
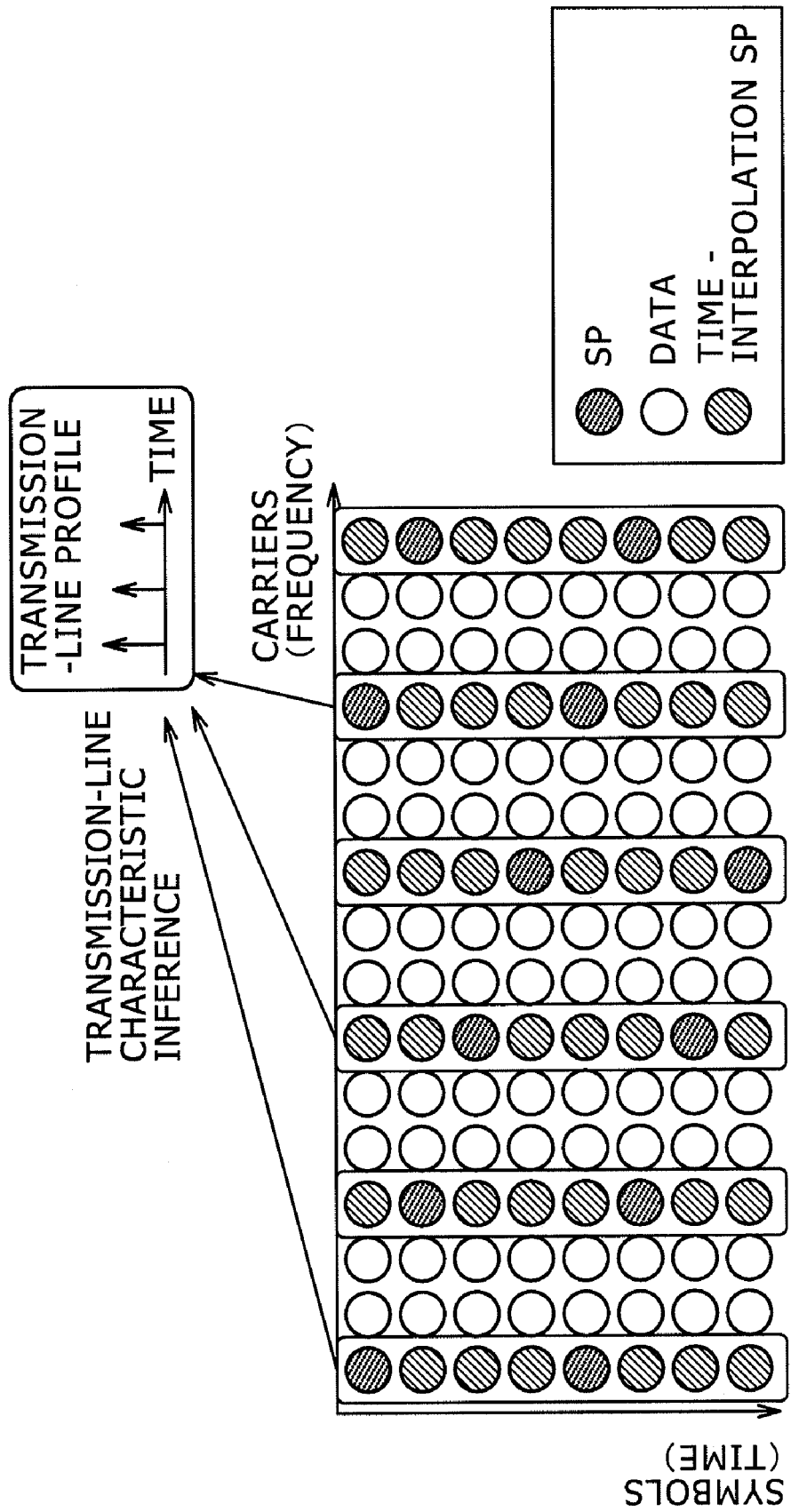
FIG. 3 is a diagram showing a typical signal-location pattern obtained as a result of an interpolation process carried out in the time direction by making use of SP signals existing among the OFDM symbols shown in the diagram of FIG. 2.
Figure 4:
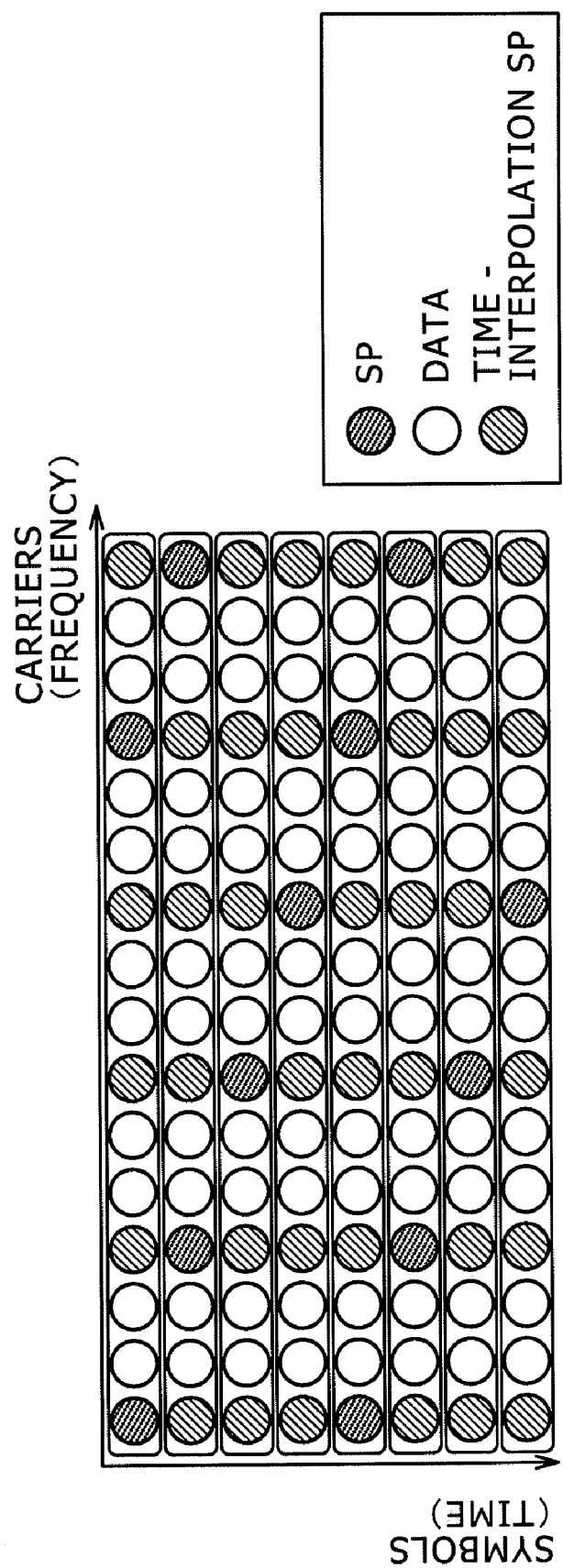
FIG. 4 is a diagram showing a typical signal-location pattern of time-interpolation SPs on which an interpolation process is to be carried out in the frequency direction by making use of SP signals existing among the OFDM symbols shown in the diagram of FIG. 2.
Figure 5:
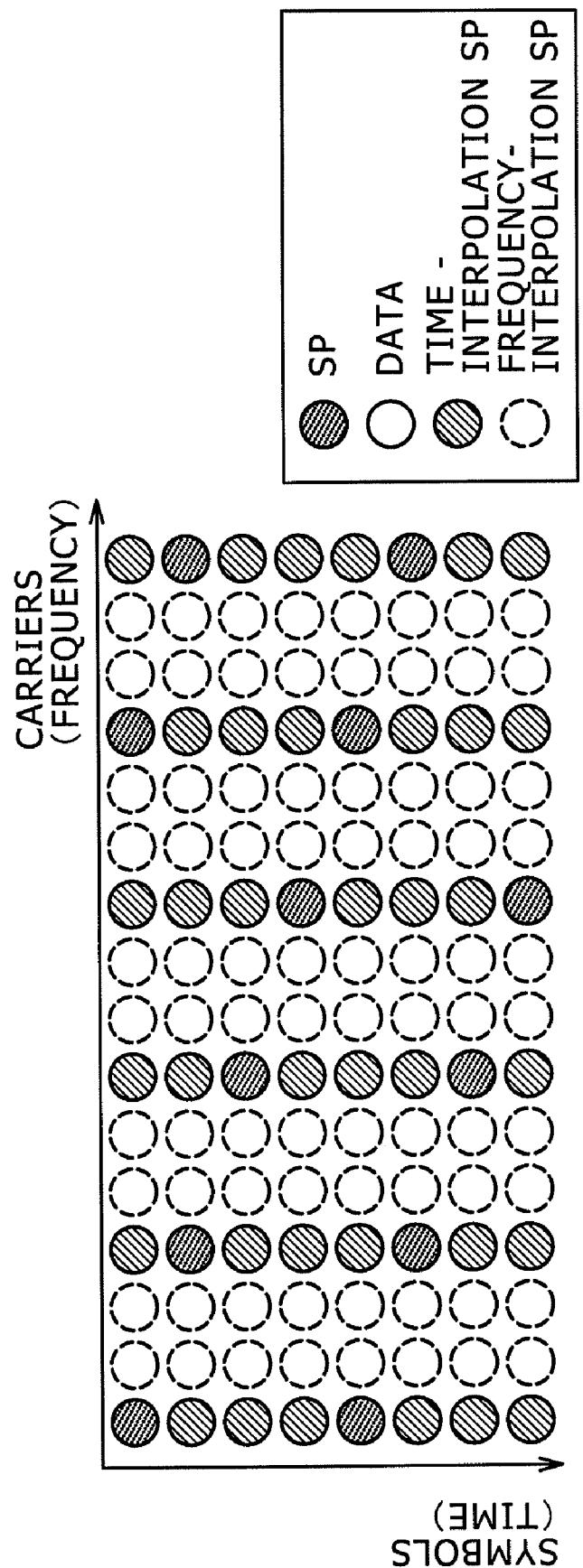
FIG. 5 is a diagram showing a typical signal-location pattern obtained as a result of an interpolation process carried out in the frequency direction on time-interpolation SPs existing among the OFDM symbols shown in the diagram of FIG. 2.
Figure 6:
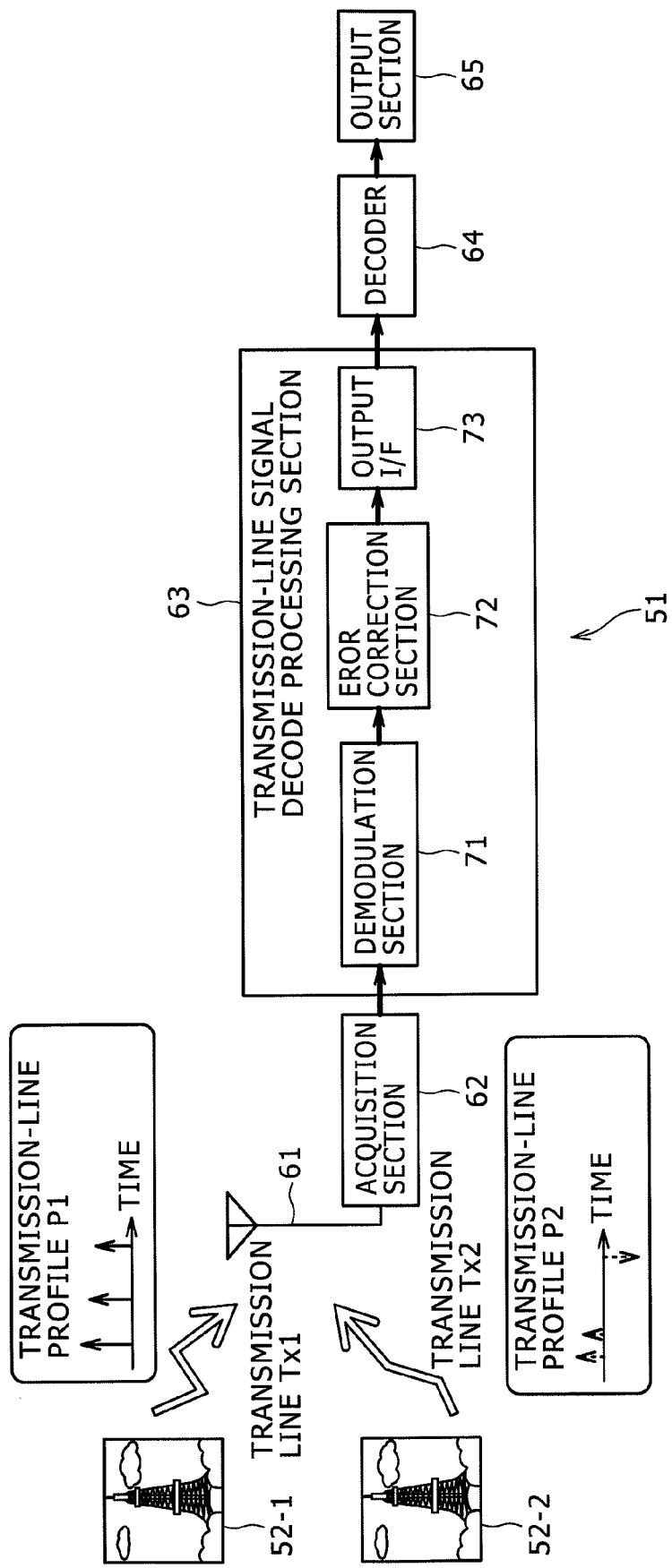
FIG. 6 is a block diagram showing a typical configuration of a signal receiving apparatus according to an embodiment of the present invention.

FIG. 6 is a block diagram showing a typical configuration of a signal receiving apparatus 51 according to an embodiment of the present invention.

As explained earlier, in May 2009, the ETSI (European Telecommunication Standard Institute) was formulating DVB (Digital Video Broadcasting)-T.2 as the standards of the terrestrial digital broadcasting of the next generation. The signal receiving apparatus 51 shown in the block diagram of FIG. 6 receives digital broadcast signals transmitted by making use of the MISO (Multiple Input, Single Output) method adopted in the DVB-T.2 standards.

As shown in the figure, signal transmitting apparatus 52-1 and 52-2 which are two signal transmitting apparatus each installed in a broadcasting station transmit digital broadcast OFDM signals by adoption of the MISO method. The signal receiving apparatus 51 receives the digital broadcast OFDM signals from the signal transmitting apparatus 52-1 and 52-2 as a single OFDM signal. The signal receiving apparatus 51 then carries out transmission-line signal decode processing on the OFDM signal in order to generate decoded data to be supplied to a section provided at a succeeding stage as a result of the transmission-line signal decode processing. The transmission-line signal decode processing carried out by the signal receiving apparatus 51 on the OFDM signal includes a demodulation process and an error correction process.

The signal transmitting apparatus 52-1 and 52-2 transmit digital broadcast OFDM signals through 2 transmission lines T×1 and T×2 respectively but the signal receiving apparatus 51 gets one OFDM signal resulting from combination of the digital broadcast OFDM signals due to the fact that the digital broadcast OFDM signals are received by one antenna 61.

In the typical configuration shown in the block diagram of FIG. 6, the signal receiving apparatus 51 employs an acquisition section 62, a transmission-line signal decode processing section 63, a decoder 64 and an output section 65 in addition to the antenna 61 cited above.

The antenna 61 receives digital broadcast OFDM signals, which are transmitted by the signal transmitting apparatus 52-1 and 52-2 through 2 transmission lines T×1 and T×2 respectively, as one OFDM signal. The antenna 61 supplies the OFDM signal received from the signal transmitting apparatus 52-1 and 52-2 to the acquisition section 62.

The acquisition section 62 is configured to include a tuner and an STB (Set Top Box). The acquisition section 62 converts the OFDM signal supplied by the antenna 61 from an RF (Radio Frequency) signal into an IF (Intermediate Frequency) signal and supplies the IF signal to the transmission-line signal decode processing section 63.

The transmission-line signal decode processing section 63 is a section for carrying out necessary processing on the signal received from the acquisition section 62 in order to generate a TS (Transport Stream) packet and supplying the TS packet to the decoder 64. The necessary processing includes a demodulation process and an error correction process.

The transmission-line signal decode processing section 63 is configured to include a demodulation section 71, an error correction section 72 and an output I/F (interface) 73.

The demodulation section 71 is a section for carrying out the demodulation process and supplying a demodulated signal obtained as a result of the demodulation process to the error correction section 72.

The signals received from the signal transmitting apparatus 52-1 and 52-2 include SP (Scattered Pilot) signals which are sum pilot signals and difference pilot signals. That is to say, each of a sum pilot signal and a difference pilot signal is an SP signal transmitted by a signal transmitting apparatus 52. A sum pilot signal transmitted by the signal transmitting apparatus 52-1 has the same phase as that of a sum pilot signal transmitted by the signal transmitting apparatus 52-2. On the other hand, a difference pilot signal transmitted by the signal transmitting apparatus 52-1 has a phase different from that of a difference pilot signal transmitted by the signal transmitting apparatus 52-2. To put it more concretely, a difference pilot signal transmitted by the signal transmitting apparatus 52-1 has a phase obtained by inverting that of a difference pilot signal transmitted by the signal transmitting apparatus 52-2.

The demodulation section 71 carries out partial processing of the demodulation process by making use of at least one of a sum pilot signal and a difference pilot signal which are extracted from a signal received from the acquisition section 62. It is desirable to provide a configuration in which the demodulation section 71 carries out partial processing of the demodulation process by making use of a sum pilot signal.

For example, the partial processing carried out by the demodulation section 71 includes a process of finding transmission-line profiles P1 and P2, a process of finding the trigger position of an FFT calculation and a process of finding the center position of a frequency-interpolation filter. The transmission-line profile P1 is the characteristic of the transmission line T×1 between the signal transmitting apparatus 52-1 and the signal receiving apparatus 51 whereas the transmission-line profile P2 is the characteristic of the transmission line T×2 between the signal transmitting apparatus 52-2 and the signal receiving apparatus 51.

It is to be noted that, as shown in the block diagram of FIG. 6, the transmission-line characteristic represented by the transmission-line profile P1 as the characteristic of the transmission line T×1 between the signal transmitting apparatus 52-1 and the signal receiving apparatus 51 is a response to an impulse input in the time region. By the same token, the transmission-line characteristic represented by the transmission-line profile P2 as the characteristic of the transmission line T×2 between the signal transmitting apparatus 52-2 and the signal receiving apparatus 51 is a response to an impulse input in the time region.

In addition, the demodulation section 71 also carries out other partial processing of the demodulation process by making use of both a sum pilot signal and a difference pilot signal. For example, the other partial processing carried out by the demodulation section 71 includes a process of finding channel characteristics C1 and C2 as well as an equalization process carried out on the signal received from the acquisition section 62. The channel characteristic C1 is the frequency-direction transmission-line characteristic of the transmission line T×1 whereas the channel characteristic C2 is the frequency-direction transmission-line characteristic of the transmission line T×2.

The error correction section 72 is a section for carrying out error correction processing on a demodulated signal received from the demodulation section 71 and supplying the result of the error correction processing to the output I/F 73.

Each of the signal transmitting apparatus 52-1 and 52-2 carries out an MPEG (Moving Picture Expert Group) encoding process on data such as TV-program images and TV-program sounds and puts data obtained as a result of the MPEG encoding process in a TS (Transport Stream) packet. Then, each of the signal transmitting apparatus 52-1 and 52-2 transmits a TS including such packets to the signal receiving apparatus 51 as an OFDM signal.

In addition, in order to cope with errors generated on a transmission line, each of the signal transmitting apparatus 52-1 and 52-2 encodes the TS into encoded codes by making use of an error correction code such as an RS (Reed-Solomon) code or an LDPC (Low Density Parity Check) code. Thus, the error correction section 72 employed in the signal receiving apparatus 51 is capable of eliminating errors from the encoded codes in the error correction processing cited above.

The output I/F 73 is a section for outputting packets included in the TS received from the error correction section 72 to the decoder 64 at a fixed rate determined in advance.

The decoder 64 is a section for carrying out an MPEG decoding process on encoded data included in TS packets received from the output I/F 73. The decoder 64 supplies image and sound data obtained as a result of the MPEG decoding process to the output section 65.

The output section 65 is a section for displaying images and generating sounds on the basis of respectively the image and sound data received from the decoder 64. For example, the output section 65 has a display unit and a speaker.

Configuration of the Demodulation Section

Figure 7:
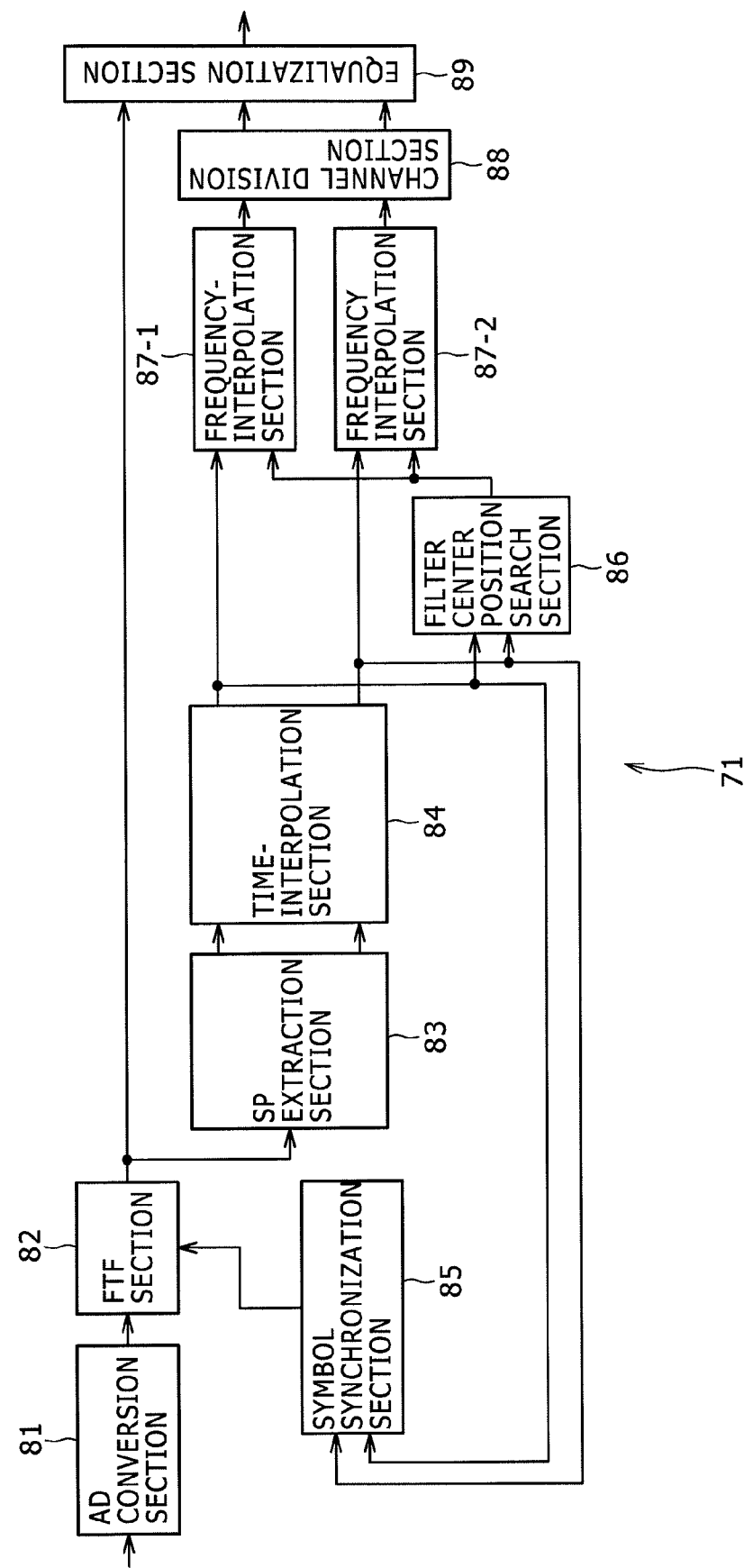
FIG. 7 is a block diagram showing a typical configuration of a demodulation section employed in the signal receiving apparatus shown in the block diagram of FIG. 6.

FIG. 7 is a block diagram showing a typical configuration of the demodulation section 71 employed in the signal receiving apparatus 51 shown in the block diagram of FIG. 6.

The demodulation section 71 shown in the block diagram of FIG. 7 is configured to employ an AD (Analog to Digital)

conversion section 81, an FFT section 82, an SP (Scattered Pilot) extraction section 83, a time interpolation section 84, a symbol synchronization section 85, a filter center-position search section 86, frequency-interpolation sections 87-1 and 87-2, a channel division section 88 as well as an equalization section 89.

The AD conversion section 81 is a section for carrying out an AD conversion process on an analog signal received from the acquisition section 62 and supplying a digital signal obtained as a result of the AD conversion process to the FFT section 82.

On the basis of a command issued by the symbol synchronization section 85 to serve as a command indicating a trigger position, the FFT section 82 carries out an FFT calculation process on data in a predetermined segment of the digital signal received from the AD conversion section 81 and supplies a signal obtained as a result of the FFT calculation process to the SP extraction section 83 and the equalization section 89.

From the signal received from the FFT section 82 as a result of the FFT calculation process, the SP extraction section 83 extracts a sum pilot signal and a difference pilot signal, which are each an SP signal, supplying the sum pilot signal and the difference pilot signal to the time interpolation section 84.

The time interpolation section 84 is a section for carrying out an interpolation process in the time direction by making use of aforementioned sum pilot signals received from the SP extraction section 83 and carrying out an interpolation process in the time direction by making use of aforementioned difference pilot signals received from the SP extraction section 83. To put it in detail, the time interpolation section 84 compares a sum pilot signal extracted from the result of the FFT calculation process with a sum pilot signal known at the signal transmitting time in order to find a characteristic exhibited by the transmission line at the position of the sum pilot signal. Then, on the basis of the characteristics exhibited by the transmission line at the positions of the sum pilot signals, the time interpolation section 84 carries out an interpolation process in the time direction of carriers, among which sum pilot signals are located, for every symbol. As a result of the interpolation process carried out in the time direction, the time interpolation section 84 generates new time-interpolation SPs from the sum pilot signals.

By the same token, the time interpolation section 84 compares a difference pilot signal extracted from the result of the FFT calculation process with a difference pilot signal known at the signal transmitting time in order to find a characteristic exhibited by the transmission line at the position of the difference pilot signal. Then, on the basis of the characteristics exhibited by the transmission line at the positions of the difference pilot signals, the time interpolation section 84 carries out an interpolation process in the time direction of carriers, among which difference pilot signals are located, for every symbol. As a result of the interpolation process carried out in the time direction, the time interpolation section 84 generates new time-interpolation SPs from the difference pilot signals.

In the following description, a time-interpolation SP generated from sum pilot signals is also referred to as a time-interpolation SP (Sum) whereas a time-interpolation SP generated from difference pilot signals is also referred to as a time-interpolation SP (Difference).

The time interpolation section 84 supplies the time-interpolation SPs (Sum) including sum pilot signals to the symbol synchronization section 85, the filter center-position search section 86 and the sum frequency-interpolation section 87-1. In the following description, each of the time-interpolation SPs (Sum) including sum pilot signals is referred to as a post-time-interpolation sum pilot.

On the other hand, the time interpolation section 84 supplies the time-interpolation SPs (Difference) including difference pilot signals to the symbol synchronization section 85, the filter center-position search section 86 and the difference frequency-interpolation section 87-2. In the following description, each of the time-interpolation SPs (Difference) including difference pilot signals is referred to as a post-time-interpolation difference pilot.

The symbol synchronization section 85 is a section for carrying out an IFFT (Inverse FFT) process in order to generate pre-FFT data and comparing the pre-FFT data with either the post-time-interpolation sum pilots or the post-time-interpolation difference pilots in order to infer the characteristic of the transmission line for every symbol. As a result, for all symbols, the characteristic of the transmission line is inferred for every 6 carriers laid out in the frequency direction. Then, the characteristics of the transmission line are used to obtain the transmission-line profiles P1 and P2 showing the characteristics of the 2 transmission lines Tx1 and Tx2 respectively.

It is to be noted that the symbol synchronization section 85 is also capable of inferring transmission-line characteristics by making use of both the post-time-interpolation sum pilots and the post-time-interpolation difference pilots. In this case, for all symbols, transmission-line characteristics of 2 different types are inferred for every 6 carriers laid out in the frequency direction. The inferred transmission-line characteristics of 2 different types are then used to obtain the transmission-line profiles P1 and P2.

The symbol synchronization section 85 computes an optimum FFT-calculation trigger position from the transmission-line profiles P1 and P2. The symbol synchronization section 85 then supplies information on the trigger position of the FFT calculation to the FFT section 82.

The filter center-position search section 86 is a section for searching for an optimum center position of a frequency-interpolation filter by making use of either the post-time-interpolation sum pilots or the post-time-interpolation difference pilots.

Figure 12:
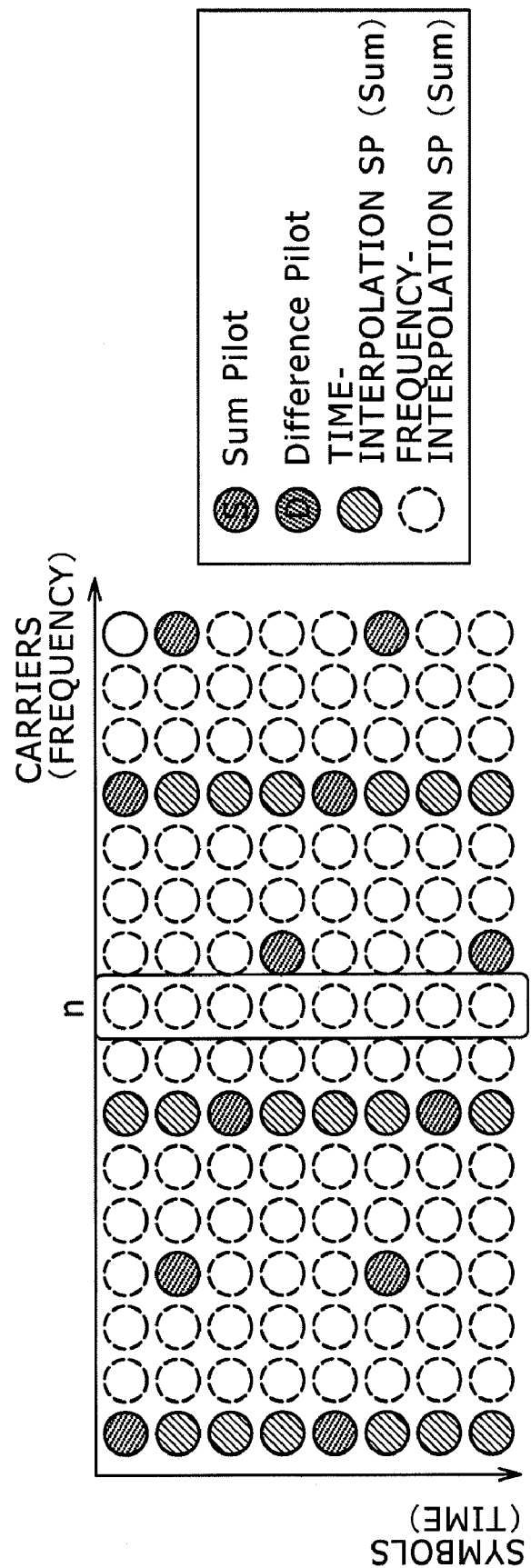
FIG. 12 is an explanatory diagram showing results of the time and frequency interpolations carried out on sum pilot signals in the signal-location pattern shown in the diagram of FIG. 11 during the process to search for an optimum center position of a frequency-interpolation filter in the case of the MISO method.

For example, the filter center-position search section 86 implements the frequency-interpolation filter at candidate center positions for the post-time-interpolation sum pilots (or the post-time-interpolation difference pilots) in order to obtain frequency-interpolation SPs (Sum) shown in the diagram of FIG. 12 as frequency-interpolation SPs (Sum) obtained as a result of the implementation of the frequency-interpolation filter for all the candidate center positions. Then, the filter center-position search section 86 compares each of the frequency-interpolation SPs obtained as a result of the implementation of the frequency-interpolation filter with a signal known at the signal receiving time. In this way, the filter center-position search section 86 is capable of finding an optimum center position of the frequency-interpolation filter.

It is to be noted that, in accordance with the MISO method, a typical example of the known signal to be compared with a frequency-interpolation SP obtained as a result of the interpolation process is a continues pilot signal placed among carriers among which no SP signals are located. In the following description, the continues pilot signal is referred to as a CP on Non-SP signal which is an abbreviation for the continuous pilot on non-scattered pilot signal.

The filter center-position search section 86 supplies information on the optimum center position of the frequency-interpolation filter to the sum frequency-interpolation section 87-1 and the difference frequency-interpolation section 87-2.

The sum frequency-interpolation section 87-1 shifts (or rotates) the position of the frequency-interpolation filter in order to adjust the position of the filter to the optimum center position and implements the frequency-interpolation filter for the post-time-interpolation sum pilots. In this way, an interpolation process is carried out in the frequency direction on the post-time-interpolation sum pilots in order to generate new frequency-interpolation SPs (Sum) which include the post-time-interpolation sum pilot signals. In the following description, each of the frequency-interpolation SPs (Sum) including the post-time-interpolation sum pilot signals is referred to as a post-frequency-interpolation sum pilot. The sum frequency-interpolation section 87-1 supplies the post-frequency-interpolation sum pilots to the channel division section 88.

On the other hand, the difference frequency-interpolation section 87-2 shifts (or rotates) the position of the frequency-interpolation filter in order to adjust the position of the filter to the optimum center position and implements the frequency-interpolation filter for the post-time-interpolation difference pilots. In this way, an interpolation process is carried out in the frequency direction on the post-time-interpolation difference pilots in order to generate new frequency-interpolation SPs (Difference) which include the post-time-interpolation difference pilot signals. In the following description, each of the frequency-interpolation SPs (Difference) including the post-time-interpolation difference pilot signals is referred to as a post-frequency-interpolation difference pilot. The difference frequency-interpolation section 87-2 supplies the post-frequency-interpolation difference pilots to the channel division section 88.

The channel division section 88 makes use of the post-frequency-interpolation sum pilots and the post-frequency-interpolation difference pilots for finding channel inferred values C1 and C2. The channel inferred value C1 is the transmission-line characteristic of the transmission line T×1 whereas the channel inferred value C2 is the transmission-line characteristic of the transmission line T×2. Each of the transmission-line characteristic of the transmission line T×1 and the transmission-line characteristic of the transmission line T×2 is a response to an impulse input in the frequency region. The channel division section 88 then supplies the channel inferred values C1 and C2 to the equalization section 89.

The equalization section 89 carries out an equalization process of dividing the signal received from the FFT section 82 as a result of the FFT calculation by the channel inferred values C1 and C2 in order to equalize the signals transmitted by the signal transmitting apparatus 52-1 and 52-2. The equalization section 89 then supplies the equalized signals obtained as a result of the equalization process to the error correction section 72. That is to say, the equalization section 89 carries out an equalization process by making use of both the post-frequency-interpolation sum pilots and the post-frequency-interpolation difference pilots.

Inference of Transmission-Line Characteristics for the MISO Method

Figure 8:
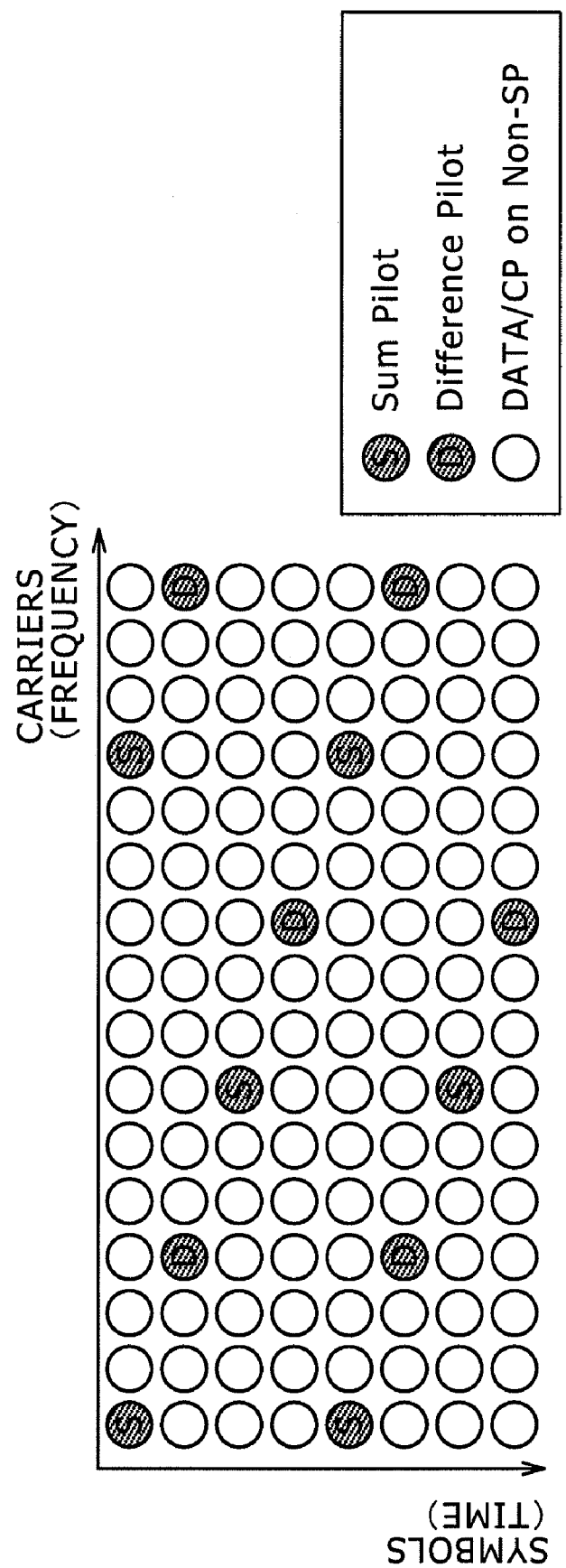
FIG. 8 is a diagram showing a typical signal-location pattern of SP signals among OFDM symbols in the case of the MISO method.
Figure 9:
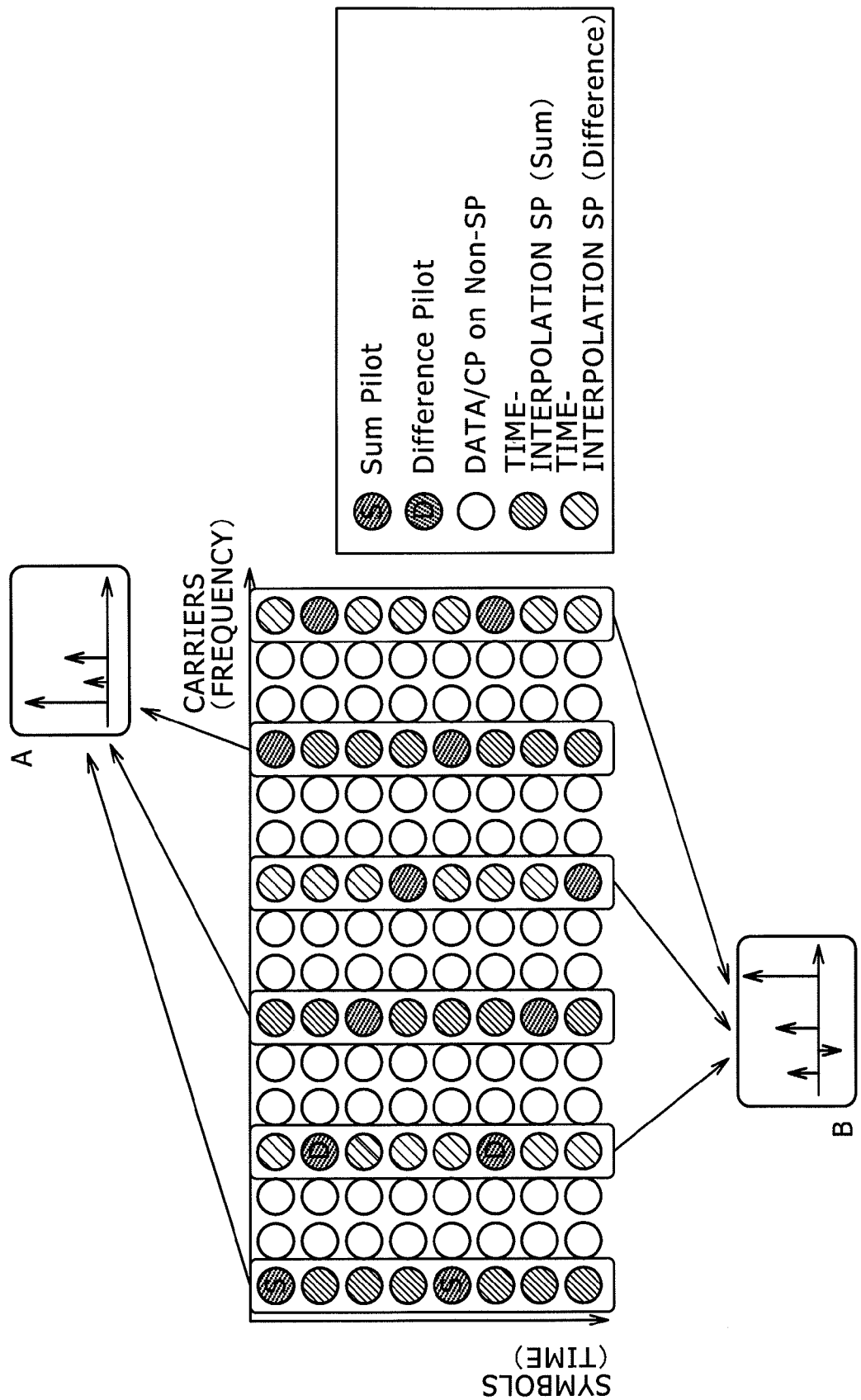
FIG. 9 is a diagram showing a typical signal-location pattern of post-time-interpolation sum and difference pilots in the case of the MISO method.

Next, by referring to diagrams of FIGS. 8 and 9, the following description explains processing to infer characteristics of transmission lines for a case in which the MISO method is adopted in transmissions of signals through the transmission lines. The processing to infer characteristics of transmission lines is carried out by the symbol synchronization section 85.

FIG. 8 is a diagram showing a typical signal-location pattern of SP signals among OFDM symbols in the case of the MISO method. The SP signals are sum pilot signals and difference pilot signals. FIG. 9 is a diagram showing a typical signal-location pattern of post-time-interpolation sum and difference pilots which are each obtained as a result of an interpolation process carried out in the time direction. In the diagrams of FIGS. 8 and 9, the horizontal axis represents carriers of the OFDM signal whereas the vertical axis represents OFDM symbols of the OFDM signal. A carrier number is assigned to every carrier whereas a symbol number is assigned to each symbol even though neither the carrier numbers nor the symbol numbers are shown in the diagrams. The carriers correspond to the frequency whereas the symbols correspond to the time.

In each of signal-location patterns shown in the diagrams of FIGS. 8 and 9, every circle represents an OFDM symbol. A white circle indicates (a carrier of) data serving as the subject of transmission. In some cases, the CP on Non-Sp signals mentioned before are included in the data represented by the white circles. A black circle marked thereon with a black capital character S represents a sum pilot signal whereas a black circle marked thereon with a black capital character D represents a difference pilot signal.

In addition, in the signal-location pattern shown in the diagram of FIG. 9, each densely hatched circle indicates a time-interpolation SP (Sum) which is also referred to as a post-time-interpolation sum pilot. On the other hand, each sparsely hatched circle indicates a time-interpolation SP (Difference) which is also referred to as a post-time-interpolation difference pilot.

The SP signal is a complex vector which has a known amplitude and a known phase. In the case of the MISO method, SP signals included an OFDM transmission frame are sum pilot signals and difference pilot signals. A sum pilot signal transmitted by the signal transmitting apparatus 52-1 has the same phase as that of a sum pilot signal transmitted by the signal transmitting apparatus 52-2. On the other hand, a difference pilot signal transmitted by the signal transmitting apparatus 52-1 has a phase different from that of a difference pilot signal transmitted by the signal transmitting apparatus 52-2. To put it more concretely, a difference pilot signal transmitted by the signal transmitting apparatus 52-1 has a phase obtained by inverting that of a difference pilot signal transmitted by the signal transmitting apparatus 52-2.

As shown in the diagram of FIG. 8, in an OFDM transmission frame, sum pilot signals and difference pilot signals are located alternately to each other at intervals of 3 carriers. That is to say, if attention is paid to only sum pilot signals, the sum pilot signals appear to be laid out at intervals of 6 carriers. By the same token, if attention is paid to only difference pilot signals, the difference pilot signals appear to be laid out at intervals of 6 carriers. Carriers of data serving as the subject of transmission are located among the pilot signals.

The signal receiving apparatus 51 receives sum pilot signals and difference pilot signals in distorted states. The sum pilot signals and the difference pilot signals are distorted by effects of the characteristics of the transmission line T×1 between the signal transmitting apparatus 52-1 and the signal receiving apparatus 51 as well as effects of the characteristics of the transmission line T×2 between the signal transmitting apparatus 52-2 and the signal receiving apparatus 51.

The time interpolation section 84 compares the sum pilot signal received at the signal receiving time with a sum pilot signal known at the signal transmitting time in order to obtain the characteristics exhibited by the transmission line T×1 and the transmission line T×2 at the position of the sum pilot signal. By the same token, the time interpolation section 84 compares the difference pilot signal received at the signal receiving time with a difference pilot signal known at the signal transmitting time in order to obtain the characteristics exhibited by the transmission line Tx1 and the transmission line Tx2 at the position of the difference pilot signal.

Then, on the basis of a characteristic exhibited by the transmission line at the position of the sum pilot signal, the time interpolation section 84 carries out an interpolation process in the time direction of carriers, among which sum pilot signals are located, for every symbol. As a result of the interpolation process carried out in the time direction, the time interpolation section 84 generates time-interpolation SPs (Sum) shown in the diagram of FIG. 9. The symbol synchronization section 85 carries out an IFFT (Inverse FFT) process in order to generate pre-FFT data shown in the diagram of FIG. 8 as the data received at the signal receiving time and compares the pre-FFT data with the time-interpolation SPs (Sum) shown in the diagram of FIG. 9 in order to infer the characteristic of the transmission line for every symbol. As a result, for all symbols, a transmission-line characteristic A is inferred for every 6 carriers laid out in the frequency direction.

By the same token, on the basis of a characteristic exhibited by the transmission line at the position of the difference pilot signal, the time interpolation section 84 carries out an interpolation process in the time direction of carriers, among which difference pilot signals are located, for every symbol. As a result of the interpolation process carried out in the time direction, the time interpolation section 84 generates time-interpolation SPs (Difference) shown in the diagram of FIG. 9. The symbol synchronization section 85 carries out an IFFT process in order to generate pre-FFT data shown in the diagram of FIG. 8 as the data received at the signal receiving time and compares the pre-FFT data with the time-interpolation SPs (Difference) shown in the diagram of FIG. 9 in order to infer the characteristic of the transmission line for every symbol. As a result, for all symbols, a transmission-line characteristic B is inferred for every 6 carriers laid out in the frequency direction.

The sum pilot signal transmitted by the signal transmitting apparatus 52-1 has the same phase as that of the sum pilot signal transmitted by the signal transmitting apparatus 52-2. Thus, as shown as a detailed breakout in the diagram of FIG. 10, the transmission-line characteristic A found on the basis of sum pilot signals is a sum of the characteristic of the transmission line Tx1 and the characteristic of the transmission line Tx2.

On the other hand, the difference signal transmitted by the signal transmitting apparatus 52-1 has a phase obtained by inverting that of the sum pilot signal transmitted by the signal transmitting apparatus 52-2. Thus, as shown as a detailed breakout in the diagram of FIG. 10, the transmission-line characteristic B found on the basis of difference pilot signals is a difference between the characteristic of the transmission line Tx1 and the characteristic of the transmission line Tx2.

Figure 10:
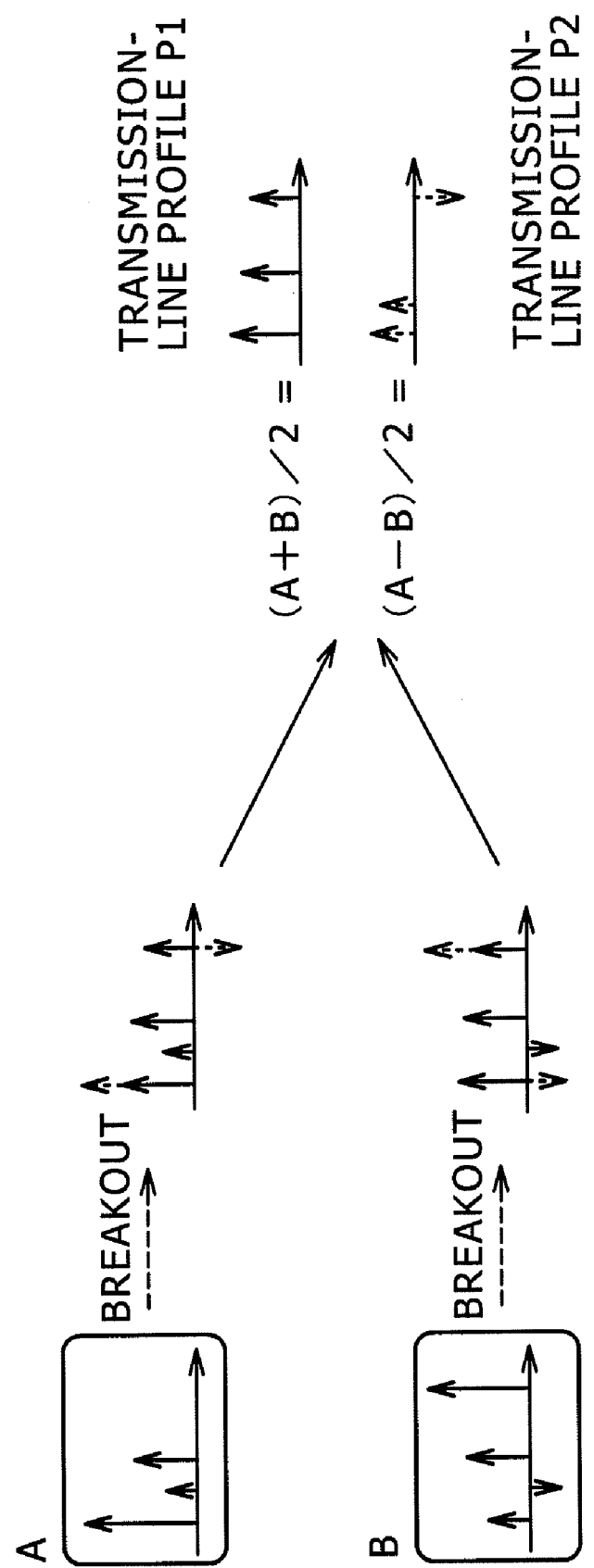
FIG. 10 is an explanatory diagram to be referred to in description of a process to infer the characteristics of a transmission line in the case of the MISO method.

Then, the symbol synchronization section 85 finds the transmission-line profile P1 representing the characteristic of the transmission line Tx1 and the transmission-line profile P2 representing the characteristic of the transmission line Tx2 by making use of the transmission-line characteristics A and B. To put it more concretely, as shown in the diagram of FIG. 10, the symbol synchronization section 85 finds the transmission-line profile P1 by dividing the sum of the transmission-line characteristics A and B by 2 and finds the transmission-line profile P2 by dividing the difference between the transmission-line characteristics A and B by 2.

It is to be noted that the method for finding the transmission-line profiles P1 and P2 is a method adopted for a case in which the characteristic of the transmission line Tx1 is different from the characteristic of the transmission line Tx2.

That is to say, in actuality, however, the signal transmitting apparatus 52-1 and 52-2 transmitting digital broadcast signals are actually installed at locations which are close to each other in many cases. Thus, the assumption that the characteristic of the transmission line Tx1 is all but identical with that of the transmission line Tx2 generally holds true. Accordingly, on the basis of this valid assumption and except for a case in which the phase of the transmission line Tx1 is the inversion of that of the transmission line Tx2, the symbol synchronization section 85 is capable of finding the transmission-line profile P1 and the transmission-line profile P2 by making use of only the transmission-line characteristic A which is found on the basis of the sum pilot signals only.

Thus, the demodulation section 71 is capable of carrying out the demodulation processing with a high degree of efficiency and the scale of the circuit of the signal receiving apparatus can be made smaller.

It is to be noted that instead of making use of the transmission-line characteristic A found on the basis of the sum pilot signals, the symbol synchronization section 85 is also capable of finding the transmission-line profile P1 and the transmission-line profile P2 by making use of only the transmission-line characteristic B which is found on the basis of the difference pilot signals.

In addition, it is possible to produce a result of determination as to whether or not the characteristic of the transmission line Tx1 is all but identical with that of the transmission line Tx2 on the basis of a result of determination as to whether or not the transmission-line characteristic B found by making use of the difference pilot signals is close to 0. Then, on the basis of the result of determination as to whether or not the characteristic of the transmission line Tx1 is all but identical with that of the transmission line Tx2, it is possible to determine whether the symbol synchronization section 85 should find the transmission-line profile P1 and the transmission-line profile P2 by making use of both the sum pilot signals and the difference pilot signals, the sum pilot signals only or the difference pilot signals only.

From the transmission-line profiles P1 and P2 found as described above, the symbol synchronization section 85 is capable of computing an optimum FFT-calculation trigger position.

Figure 11:
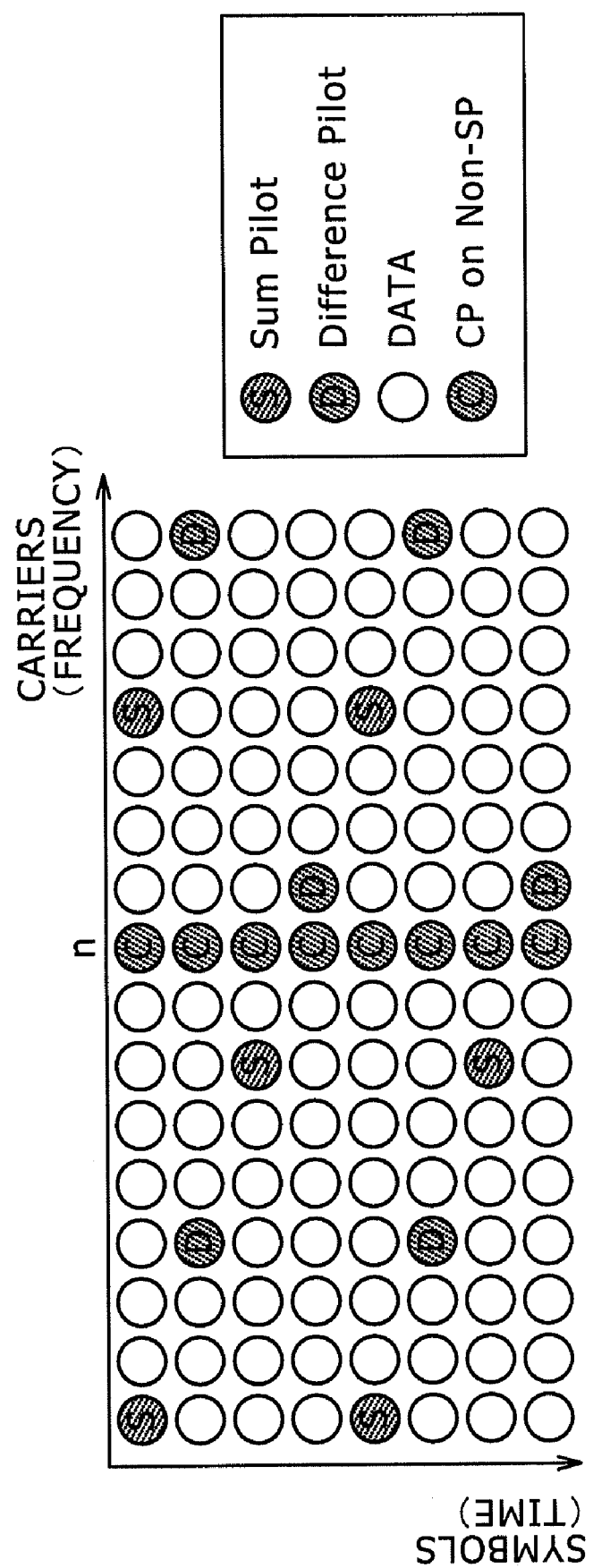
FIG. 11 is an explanatory diagram showing a signal-location pattern serving as a subject of time and frequency interpolations in a process to search for an optimum center position of a frequency-interpolation filter in the case of the MISO method.

Searching for the Optimum Center Position of a Frequency Interpolation Filter for the MISO Method Next, by referring to diagrams of FIGS. 11 and 12, the following description explains processing to search for an optimum center position of a frequency interpolation filter for a case in which the MISO method is adopted. It is the filter center-position search section 86 that carries out the processing to search for the optimum center position of a frequency interpolation filter.

FIG. 11 is an explanatory diagram showing a typical signal-location pattern of SP signals among OFDM symbols for a case in which the MISO method is adapted. In this case, the SP signals are sum pilot signals, difference pilot signals and CP on Non-SP signals. FIG. 12 is an explanatory diagram showing a typical signal-location pattern of SP signals obtained as a result of a frequency-interpolation process carried out on the sum pilot signals. In the diagrams of FIGS. 11 and 12, the horizontal axis represents carriers of the OFDM signal whereas the vertical axis represents OFDM symbols of the OFDM signal. A carrier number is assigned to every carrier whereas a symbol number is assigned to each symbol even though neither the carrier numbers nor the symbol numbers are shown in the diagrams. The carriers correspond to the frequency whereas the symbols correspond to the time.

In each of signal-location patterns shown in the diagrams of FIGS. 11 and 12, every circle represents an OFDM symbol. A white circle indicates (a carrier of) data serving as the subject of transmission. A black circle marked thereon with a black capital character S represents a sum pilot signal whereas a black circle marked thereon with a black capital character D represents a difference pilot signal.

In the signal-location pattern shown in the diagram of FIG. 11, each black circle representing a carrier provided with a carrier number of n is marked thereon with a black character C to indicate a CP on Non SP signal. In the signal-location pattern shown in the diagram of FIG. 12, each densely hatched circle indicates a time-interpolation SP (Sum) also referred to as a post-time-interpolation sum pilot whereas each dashed-line circle indicates a frequency-interpolation SP (Sum) also referred to as a post-frequency-interpolation sum pilot.

For a case in which the MISO method is adapted, an OFDM transmission frame includes CP on Non-SP signals as known signals in addition to the sum pilot signals and the difference pilot signals. Each of the CP on Non-SP signals is located in a carrier occupied by neither a sum pilot signal nor a difference pilot signal. In the typical signal-location pattern shown in the diagram of FIG. 11 for example, each of the CP on Non-SP signals is located in a carrier having a carrier number of n.

The filter center-position search section 86 implements a frequency-interpolation filter at candidate center positions for time-interpolation SPs (Sum) each also referred to as a post-time-interpolation sum pilot in order to generate frequency-interpolation SPs (Sum) each also referred to as a post-frequency-interpolation sum pilot in the signal-location pattern shown in the diagram of FIG. 12 at all the candidate center positions.

Figure 13:
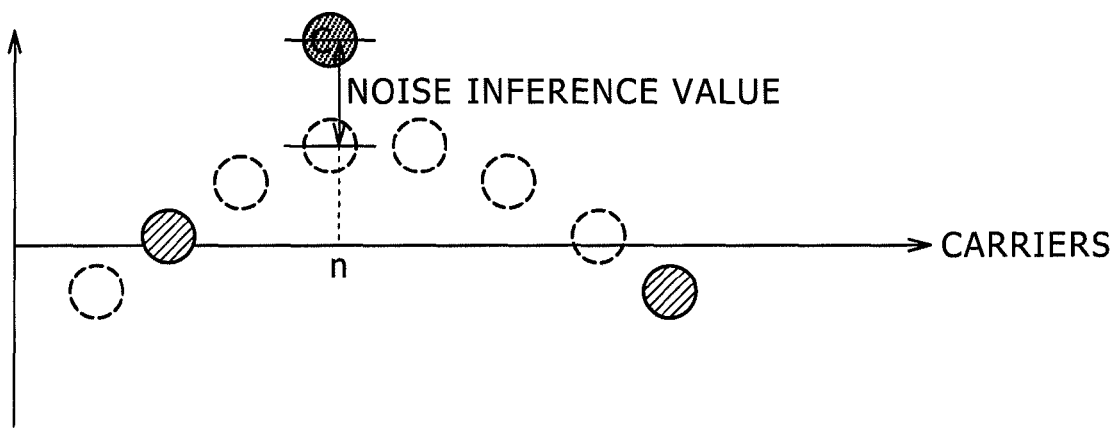
FIG. 13 is an explanatory diagram showing a noise inference value observed in the results shown in the diagram of FIG. 12 to serve as results obtained in the course of the process to search for an optimum center position of a frequency-interpolation filter in the case of the MISO method.

Then, the filter center-position search section 86 computes a noise inference value for each carrier provided with a carrier number of n to serve as a carrier in which a known CP on Non-SP signal is located as shown in a diagram of FIG. 13. The noise inference value is the difference between a frequency-interpolation SP (Sum) and the actually received value of the known CP on Non-SP signal.

In the diagram of FIG. 13 showing a typical graph, the horizontal axis represents carriers (or the frequency) whereas the vertical axis represents the amplitude. The graph shows the amplitude of each of frequency-interpolation SPs (Sum) surrounding the carrier provided with the carrier number of n as well as the frequency-interpolation SP (Sum) at the carrier provided with the carrier number of n as shown by the signal-location pattern in the diagram of FIG. 12 and the amplitude of the actually received value of the known CP on Non-SP signal located at the carrier provided with the carrier number of n as shown by the signal-location pattern in the diagram of FIG. 11. As shown by the graph, there is an error between the amplitude of each of frequency-interpolation SPs (Sum) surrounding the carrier provided with the carrier number of n as well as the frequency-interpolation SP (Sum) at the carrier provided with the carrier number of n and the amplitude of the actually received value of the known CP on Non-SP signal located in the carrier provided with the carrier number of n. In the following description, such an error is referred to as a noise inference value.

Subsequently, among the candidate center positions, the filter center-position search section 86 selects a center position that has the smallest noise inference value. The selected center position is referred to as an optimum center position of a frequency interpolation filter. The filter center-position search section 86 supplies information on the optimum center position of a frequency interpolation filter to the sum frequency-interpolation section 87-1 and the difference frequency-interpolation section 87-2.

Each of the sum frequency-interpolation section 87-1 and the difference frequency-interpolation section 87-2 makes use of the information on the optimum center position of a frequency interpolation filter in implementing the frequency interpolation filter.

As described above, the filter center-position search section 86 finds the optimum center position of a frequency interpolation filter by making use of only one of the 2 types of SP signal. To put it more concretely, the filter center-position search section 86 makes use of only the sum pilot signals to determine the optimum center position of a frequency interpolation filter. Thus, the efficiency of the demodulation processing can be improved. In addition, the scale of the circuit of the demodulation section 71 can be made smaller.

In the method explained above by referring to the diagrams of FIGS. 11 to 13 as a method to search for the optimum center position of a frequency interpolation filter, only sum pilot signals are used. It is to be noted, however, that an alternative method can be adopted. In accordance with the alternative method, the optimum center position of a frequency interpolation filter is found by making use of only difference pilot signals or both sum pilot signals and difference pilot signals.

Demodulation Processing for the MISO Method

Figure 14:
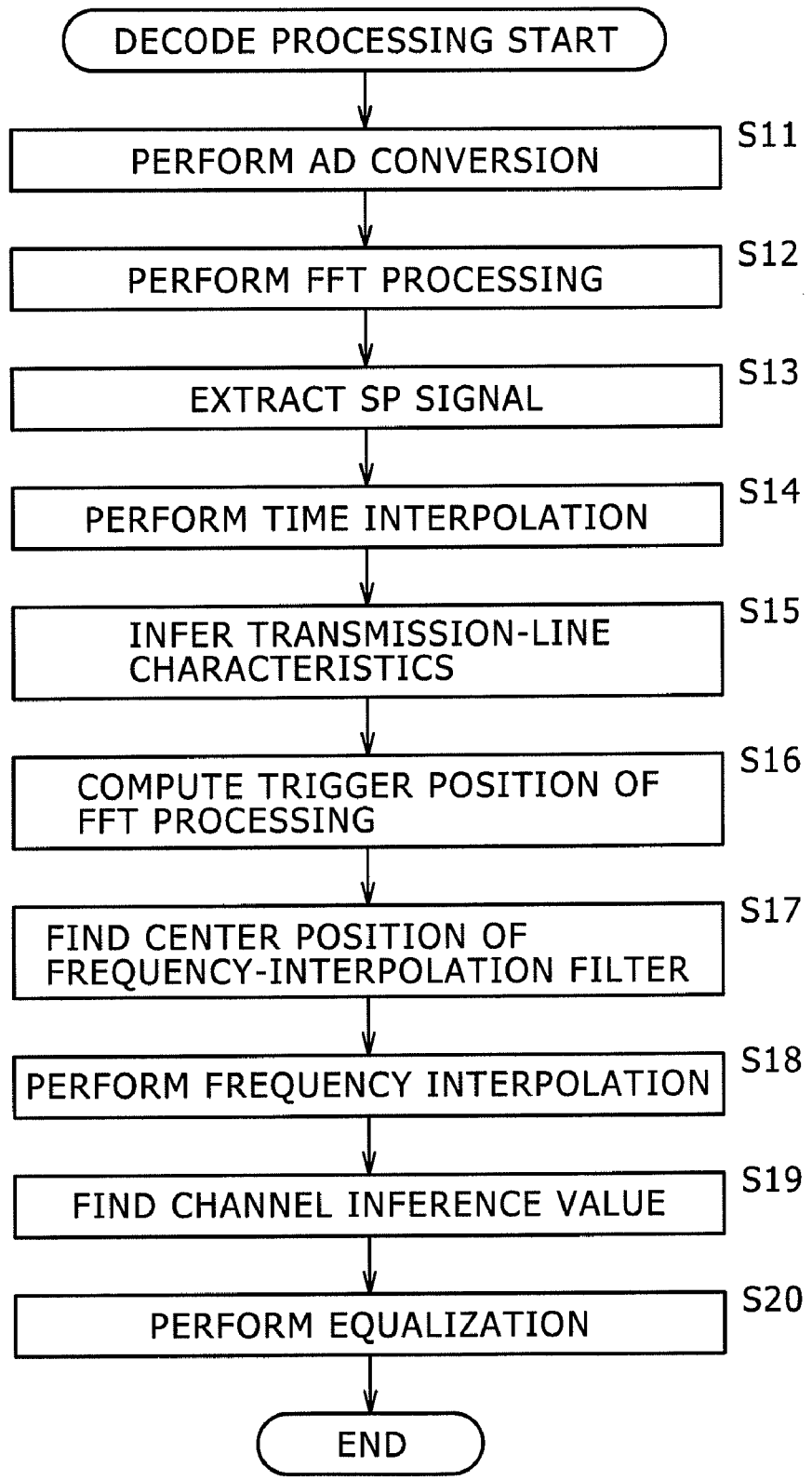
FIG. 14 shows a flowchart to be referred to in explanation of signal receiving processing carried out by the signal receiving apparatus shown in the block diagram of FIG. 6.

Next, by referring to a flowchart shown in FIG. 14, the following description explains demodulation processing carried out by the signal receiving apparatus 51 on digital broadcast OFDM signals transmitted by the signal transmitting apparatus 52 by adoption of the MISO method.

The antenna 61 receives digital broadcast OFDM signals, which are transmitted by the signal transmitting apparatus 52-1 and 52-2 through 2 transmission lines T×1 and T×2 respectively, as one OFDM signal. The antenna 61 supplies the OFDM signal received from the signal transmitting apparatus 52-1 and 52-2 to the acquisition section 62. The acquisition section 62 converts the OFDM signal supplied by the antenna 61 from an RF (Radio Frequency) signal into an IF (Intermediate Frequency) signal and supplies the IF signal to the AD conversion section 81 employed in the demodulation section 71 of the transmission-line signal decode processing section 63.

As shown in FIG. 14, the flowchart begins with a step S11 at which the AD conversion section 81 carries out an AD conversion process on an analog signal received from the acquisition section 62 and supplies a digital signal obtained as a result of the AD conversion process to the FFT section 82.

Then, at the next step S12, on the basis of a command issued by the symbol synchronization section 85 to serve as a command indicating a trigger position, the FFT section 82 carries out an FFT calculation process on data in a predetermined segment of the digital signal received from the AD conversion section 81 and supplies a signal obtained as a result of the FFT calculation process to the SP extraction section 83 and the equalization section 89. The symbol synchronization section 85 computes the trigger position at a step S16 which will be described later.

Subsequently, at the next step S13, from the signal received from the FFT section 82 as a result of the FFT calculation process, the SP extraction section 83 extracts a sum pilot signal and a difference pilot signal, which are each an SP signal, supplying the sum pilot signal and the difference pilot signal to the time interpolation section 84.

Then, at the next step S14, the time interpolation section 84 carries out a time-interpolation process by making use of aforementioned sum pilot signals received from the SP extraction section 83 and carries out a time-interpolation process by making use of aforementioned difference pilot signals received from the SP extraction section 83.

To put it in detail, the time interpolation section 84 compares a sum pilot signal extracted from the result of the FFT calculation process with a sum pilot signal known at the signal transmitting time in order to find a characteristic exhibited by the transmission line at the position of the sum pilot signal. Then, on the basis of the characteristics exhibited by the transmission line at the positions of the sum pilot signals, the time interpolation section 84 carries out an interpolation process in the time direction of carriers, among which sum pilot signals are located, for every symbol. As a result of the interpolation process carried out in the time direction, the time interpolation section 84 generates new time-interpolation SPs from the sum pilot signals. As described above, a new time-interpolation SP generated from sum pilot signals is also referred to as a time-interpolation SP (Sum) whereas each of the time-interpolation SPs (Sum) including original sum pilot signals is referred to as a post-time-interpolation sum pilot.

By the same token, the time interpolation section 84 compares a difference pilot signal extracted from the result of the FFT calculation process with a difference pilot signal known at the signal transmitting time in order to find a characteristic exhibited by the transmission line at the position of the difference pilot signal. Then, on the basis of the characteristics exhibited by the transmission line at the positions of the difference pilot signals, the time interpolation section 84 carries out an interpolation process in the time direction of carriers, among which difference pilot signals are located, for every symbol. As a result of the interpolation process carried out in the time direction, the time interpolation section 84 generates new time-interpolation SPs from the difference pilot signals. As described above, a new time-interpolation SP generated from difference pilot signals is also referred to as a time-interpolation SP (Difference) whereas each of the time-interpolation SPs (Difference) including original difference pilot signals is referred to as a post-time-interpolation difference pilot.

The time interpolation section 84 supplies the time-interpolation SPs (Sum) including sum pilot signals to the symbol synchronization section 85, the filter center-position search section 86 and the sum frequency-interpolation section 87-1. As described above, each of the time-interpolation SPs (Sum) including sum pilot signals is referred to as a post-time-interpolation sum pilot.

On the other hand, the time interpolation section 84 supplies the time-interpolation SPs (Difference) including difference pilot signals to the symbol synchronization section 85, the filter center-position search section 86 and the difference frequency-interpolation section 87-2. As described above, each of the time-interpolation SPs (Difference) including difference pilot signals is referred to as a post-time-interpolation difference pilot.

Subsequently, at the next step S15, the symbol synchronization section 85 carries out an IFFT (Inverse FFT) process in order to generate pre-FFT data shown in the diagram of FIG. 8 as the data received at the signal receiving time and compares the pre-FFT data with the post-time-interpolation sum pilots shown in the diagram of FIG. 9 in order to infer the characteristic of the transmission line for every symbol. As a result, for all symbols, a transmission-line characteristic A is inferred for every 6 carriers laid out in the frequency direction. Then, the symbol synchronization section 85 finds the transmission-line profile P1 representing the characteristic of the transmission line Tx1 between the signal transmitting apparatus 52-1 and the signal receiving apparatus 51 as well as the transmission-line profile P2 representing the characteristic of the transmission line Tx2 between the signal transmitting apparatus 52-2 and the signal receiving apparatus 51 by making use of the transmission-line characteristic A as explained earlier by referring to the diagram of FIG. 10. It is to be noted that, if the signal transmitting apparatus 52-1 and 52-2 are installed at locations close to each other, the transmission-line profiles P1 and P2 represent transmission-line characteristics which are all but identical with each other.

Then, at the next step S16, the symbol synchronization section 85 computes an optimum FFT-calculation trigger position from the transmission-line profiles P1 and P2. The symbol synchronization section 85 supplies information on the trigger position of the FFT calculation to the FFT section 82. The information on the trigger position is used in the FFT calculation process carried out by the FFT section 82 at the step S12 described above.

Subsequently, at the next step S17, the filter center-position search section 86 searches for an optimum center position of a frequency-interpolation filter by making use of the post-time-interpolation sum pilots for example as follows. The filter center-position search section 86 for example implements the frequency-interpolation filter at candidate center positions for the post-time-interpolation sum pilots in order to obtain frequency-interpolation SPs (Sum) obtained as a result of the implementation of the frequency-interpolation filter for all the candidate center positions as shown in the diagram of FIG. 12. As described earlier, each of the frequency-interpolation SPs (Sum) is referred to as a post-frequency-interpolation sum pilot.

Then, the filter center-position search section 86 computes a noise inference value for each carrier provided with a carrier number of n to serve as a carrier in which a known CP on Non-SP signal is located as shown in a diagram of FIG. 13. The noise inference value is the difference between a frequency-interpolation SP (Sum) and the actually received value of the known CP on Non-SP signal. That is to say, the filter center-position search section 86 computes the noise inference value by comparing the frequency-interpolation SP (Sum) with the actually received value of the known CP on Non-SP signal. Subsequently, among the candidate center positions, the filter center-position search section 86 selects a center position that has the smallest noise inference value. The selected center position is referred to as an optimum center position of a frequency-interpolation filter. The filter center-position search section 86 supplies information on the optimum center position of a frequency-interpolation filter to the sum frequency-interpolation section 87-1 and the difference frequency-interpolation section 87-2.

Then, at the next step S18, the sum frequency-interpolation section 87-1 and the difference frequency-interpolation section 87-2 make use of the information on the optimum center position of a frequency-interpolation filter to carry out a frequency-interpolation process on the post-time-interpolation sum pilots and the post-time-interpolation difference pilots.

To put it in detail, the sum frequency-interpolation section 87-1 shifts (or rotates) the position of the frequency-interpolation filter in order to adjust the position of the frequency-interpolation filter to the optimum center position of the frequency-interpolation filter and implements the frequency-interpolation filter for the post-time-interpolation sum pilots. In this way, an interpolation process is carried out in the frequency direction on the post-time-interpolation sum pilots in order to generate new frequency-interpolation SPs (Sum)

which include the post-time-interpolation sum pilot signals. In the following description, each of the frequency-interpolation SPs (Sum) including the post-time-interpolation sum pilot signals is referred to as a post-frequency-interpolation sum pilot. The sum frequency-interpolation section 87-1 supplies the post-frequency-interpolation sum pilots to the channel division section 88.

On the other hand, the difference frequency-interpolation section 87-2 shifts (or rotates) the position of the frequency-interpolation filter in order to adjust the position of the frequency-interpolation filter to the optimum center position of the frequency-interpolation filter and implements the frequency-interpolation filter for the post-time-interpolation difference pilots. In this way, an interpolation process is carried out in the frequency direction on the post-time-interpolation difference pilots in order to generate new frequency-interpolation SPs (Difference) which include the post-time-interpolation difference pilot signals. In the following description, each of the frequency-interpolation SPs (Difference) including the post-time-interpolation difference pilot signals is referred to as a post-frequency-interpolation difference pilot. The sum frequency-interpolation section 87-1 supplies the post-frequency-interpolation difference pilots to the channel division section 88.

Subsequently, at the next step S19, the channel division section 88 makes use of the post-frequency-interpolation sum pilots and the post-frequency-interpolation difference pilots for finding channel inferred values C1 and C2. The channel inferred value C1 is the transmission-line characteristic of the transmission line Tx1 whereas the channel inferred value C2 is the transmission-line characteristic of the transmission line Tx2. Each of the transmission-line characteristic of the transmission line Tx1 and the transmission-line characteristic of the transmission line Tx2 is a response to an impulse input in the frequency region. The channel division section 88 then supplies the channel inferred values C1 and C2 to the equalization section 89.

Then, at the next step S20, in an equalization process, the equalization section 89 divides the signal, which has been received from the FFT section 82 as a result of the FFT calculation carried out by the FFT section 82 at the step S12, by the channel inferred values C1 and C2 in order to equalize the signals transmitted by the signal transmitting apparatus 52-1 and 52-2. The equalization section 89 then supplies the equalized signals to the error correction section 72.

The error correction section 72 carries out error correction processing on a demodulated signal received from the equalization section 89 of the demodulation section 71 as a result of the equalization process and supplies a TS obtained as a result of the error correction processing to the output I/F 73. The output I/F 73 carries out an output process of outputting packets included in the TS received from the error correction section 72 to the decoder 64. The decoder 64 carries out an MPEG decoding process on encoded data included in TS packets received from the output I/F 73. The decoder 64 supplies image and sound data obtained as a result of the MPEG decoding process to the output section 65. The output section 65 displays images and generates sounds on the basis of respectively the image and sound data received from the decoder 64.

As described above, the signal receiving apparatus 51 carries out partial processing of the processing to demodulate an OFDM signal, which has been received from a signal transmitting apparatus 52, by making use of only sum pilot signals. The partial processing includes a process of inferring the characteristics of a transmission line, a process of computing an optimum FFT-calculation trigger position and a process of finding the optimum center position of a frequency-interpolation filter.

Thus, the signal receiving apparatus 51 is capable of carrying out the processing to demodulate a received OFDM signal, which has been transmitted by adoption of the MISO method, with a high degree of efficiency.

In accordance with the typical flowchart shown in FIG. 14, the signal receiving apparatus 51 carries out partial processing of the processing to demodulate an OFDM signal, which has been received from a signal transmitting apparatus 52, by making use of only sum pilot signals. It is to be noted, however, that the signal receiving apparatus 51 is of course also capable of carrying out the partial processing of the processing to demodulate an OFDM signal, which has been received from a signal transmitting apparatus 52, by making use of only difference pilot signals.

In addition, it is also possible to provide a configuration wherein the signal receiving apparatus 51 carries out partial processing of the processing to demodulate an OFDM signal, which has been received from a signal transmitting apparatus 52, by making use of both sum pilot signals and difference pilot signals. In the case of such a configuration, even though the efficiency of the processing to demodulate an OFDM signal is not improved, the performance of the partial processing of the processing to demodulate an OFDM signal is enhanced.

In the above description, the signal receiving apparatus 51 receives signals from the two signal transmitting apparatus 52-1 and 52-2 through the antenna 61 employed in the signal receiving apparatus 51. It is to be noted, however, that the number of signal transmitting apparatus is by no means limited to two. That is to say, the number of signal transmitting apparatus can has any value as long as the value is greater than one.

Figure 15:
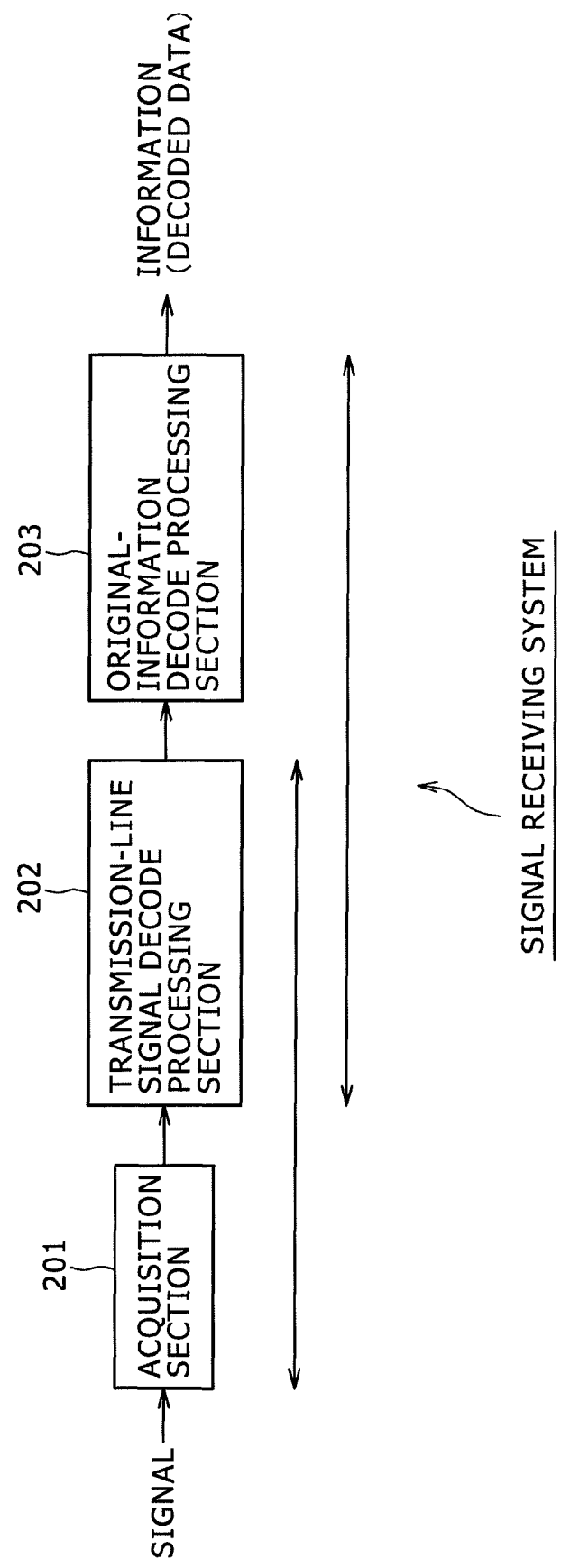
FIG. 15 is a block diagram showing a typical configuration of a signal receiving system according to a first embodiment of the present invention.

Next, signal receiving systems according to a variety of embodiments of the present invention are explained. FIG. 15 is a block diagram showing a typical configuration of a signal receiving system according to a first embodiment of the present invention.

As shown in the block diagram of FIG. 15, the signal receiving system employs an acquisition section 201, a transmission-line signal decode processing section 202 and an original-information decode processing section 203.

The acquisition section 201 is a section for receiving a signal transmitted by signal transmitting apparatus through transmission line not shown in the block diagram of FIG. 15 and supplying the signal to the transmission-line signal decode processing section 202. Typical examples of the transmission line are terrestrial digital broadcast transmission line, satellite digital broadcast transmission line, a CATV (Cable TV) network and other networks including the Internet.

If the signal is transmitted from a signal transmitting apparatus installed in a broadcasting station through the transmission line such as the terrestrial digital broadcast transmission line, the satellite digital broadcast transmission line or the CATV (Cable TV) network for example, the acquisition section 201 is configured to employ a tuner and an STB in the same say as the acquisition section 62 employed in the signal receiving apparatus 51 shown in the block diagram of FIG. 6. If the signal is transmitted from a web server by adoption of a multi-cast method such as the IPTV (Internet Protocol Television) for example, the acquisition section 201 is configured to have a network I/F such as an NIC (Network Interface Card).

As another example, signals are transmitted from a plurality of signal transmitting apparatus installed in a plurality of broadcasting stations through the transmission line such as the terrestrial digital broadcast transmission line, the satellite digital broadcast transmission line or the CATV network. In this case, the signals are transmitted to the signal receiving system through a plurality of transmission lines and received by the acquisition section 201 employed in the signal receiving system. As a result, the signal receiving system receives a signal resulting from combination of the signals transmitted by the signal transmitting apparatus.

The transmission-line signal decode processing section 202 infers the characteristics of channels and carries out transmission-line signal decode processing including at least a demodulation process on the signal received by the acquisition section 201 from the transmission lines. Then, the transmission-line signal decode processing section 202 supplies the result of the transmission-line signal decode processing to the original-information decode processing section 203.

That is to say, the signal received by the acquisition section 201 from the transmission lines is distorted due to effects of the characteristics of the transmission lines. For such a distorted signal, the transmission-line signal decode processing section 202 carries out demodulation processing including processes of inferring the characteristics of transmission lines and the characteristics of channels.

In addition, in some cases, the transmission-line signal decode processing may include a process of correcting errors generated by the transmission lines. In this case, an LDPC decoding process or a Reed-Solomon decoding process is included in the transmission-line signal decode processing as the process of correcting errors generated by the transmission lines.

The original-information decode processing section 203 is a section for carrying out original-information decode processing on the signal output by the transmission-line signal decode processing section 202 as a result of the transmission-line signal decode processing. The original-information decode processing at least includes a process to decompress compressed information conveyed by the received signal in order to generate the original information from the compressed information.

That is to say, the signal received by the acquisition section 201 from the transmission lines conveys information representing data such as images and sounds. In some cases, the information has been compressed by the signal transmitting apparatus in a compression-encoding process carried out by the signal transmitting apparatus in order to reduce the amount of data represented by the information. In such cases, the original-information decode processing section 203 carry out decompression processing to decompress a signal, which is output by the transmission-line signal decode processing section 202 as a signal conveying the compressed information, in order to generate the original information from the compressed information. In other words, original-information decode processing section 203 carry out the decompression processing on the signal output by the transmission-line signal decode processing section 202 as a result of the transmission-line signal decode processing.

It is to be noted that, if the signal received by the acquisition section 201 from the transmission lines conveys uncompressed information, the original-information decode processing section 203 does not carry out the decompression processing on the signal output by the transmission-line signal decode processing section 202 as a result of the transmission-line signal decode processing because it is not necessary to generate original information from compressed information, that is, the uncompressed information itself is the original information.

A typical example of the decompression processing is MPEG decode processing. In addition, in some configurations, the original-information decode processing carried out by the transmission-line signal decode processing section 202 is not only followed by the decompression processing performed by the original-information decode processing section 203, but is also accompanied by descramble processing or other processing.

As described above, in the signal receiving system, the acquisition section 201 receives signals from transmission lines as a single signal and supplies the single signal to the transmission-line signal decode processing section 202. Each of the signals transmitted by a signal transmitting apparatus to the signal receiving system through the transmission lines has completed a compression encoding process such as the MPEG encoding process in the signal transmitting apparatus transmitting the signal in addition to an encoding process to add codes to the signal to serve as codes to be used for an error correction process carried out in the signal receiving system. For example, each of the signals transmitted by a signal transmitting apparatus to the signal receiving system through the transmission lines conveys data such as images and sounds. The signal receiving system receives the signals transmitted by the signal transmitting apparatus through the transmission lines in a distorted state due to effects of the characteristics of the transmission lines.

For the signal received from the acquisition section 201, the transmission-line signal decode processing section 202 carries out transmission-line signal decode processing to decode the signal in the same way as the transmission-line signal decode processing section 63 employed in the signal receiving apparatus 51 shown in the block diagram of FIG. 6. The transmission-line signal decode processing section 202 then supplies the result of the transmission-line signal decode processing to the original-information decode processing section 203.

For the signal received from the transmission-line signal decode processing section 202, the original-information decode processing section 203 carries out original-information decode processing to generate pictures and/or sounds from the signal in the same way as the decoder 64 employed in the signal receiving apparatus 51 shown in the block diagram of FIG. 6.

For example, the signal receiving system having the configuration like the one shown in the block diagram of FIG. 15 is applied to a TV tuner for receiving TV broadcasts which are transmitted as digital broadcast signals.

It is to be noted that each of the acquisition section 201, the transmission-line signal decode processing section 202 and the original-information decode processing section 203 can be designed as a piece of hardware or a software module. The piece of hardware is for example a stand-alone apparatus or an IC (Integrated Circuit).

In addition, the acquisition section 201, the transmission-line signal decode processing section 202 and the original-information decode processing section 203 can be integrated with each other in a variety of combinations described as follows. For example, the acquisition section 201 and the transmission-line signal decode processing section 202 are integrated with each other to form a set. As another alternative, the transmission-line signal decode processing section 202 and the original-information decode processing section 203 are integrated with each other to form a set. As a further alternative, the acquisition section 201, the transmission-line signal decode processing section 202 and the original-information decode processing section 203 are integrated to form a set.

Figure 16:
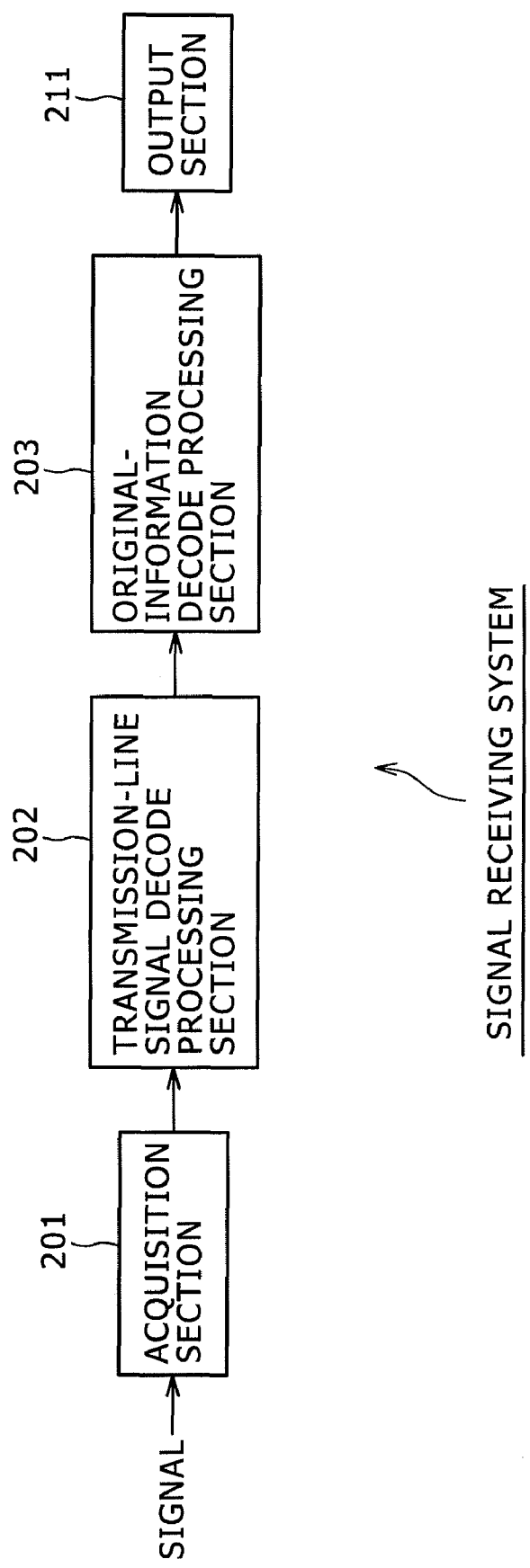
FIG. 16 is a block diagram showing a typical configuration of a signal receiving system according to a second embodiment of the present invention.

FIG. 16 is a block diagram showing a typical configuration of a signal receiving system according to a second embodiment of the present invention.

In the typical configuration of the second embodiment implementing a signal receiving system as shown in the block diagram of FIG. 16, components identical with their respective counterparts employed in the typical configuration of the first embodiment implementing a signal receiving system as shown in the block diagram of FIG. 15 are denoted by the same reference numerals as the respective counterparts.

The second embodiment implementing a signal receiving system as shown in the block diagram of FIG. 16 also employs an acquisition section 201, a transmission-line signal decode processing section 202 and an original-information decode processing section 203 in the same way as the first embodiment implementing a signal receiving system as shown in the block diagram of FIG. 15. The second embodiment implementing a signal receiving system as shown in the block diagram of FIG. 16 is different from the first embodiment implementing a signal receiving system as shown in the block diagram of FIG. 15, however, in that the second embodiment is newly provided with an output section 211.

The output section 211 for example includes a display unit for displaying images and a speaker for outputting sounds. On the basis of a signal received from the original-information decode processing section 203, the display unit displays images whereas the speaker generates sounds. That is to say, the output section 211 displays images and generates sounds.

For example, the signal receiving system having the configuration like the one shown in the block diagram of FIG. 16 is applied to a TV for receiving TV broadcasts transmitted as digital broadcast signals and to a radio receiver for receiving radio broadcasts.

It is to be noted that, if the signal received by the acquisition section 201 is a signal not subjected to an compression encoding process, a signal output by the transmission-line signal decode processing section 202 can be supplied to the output section 211 directly.

Figure 17:
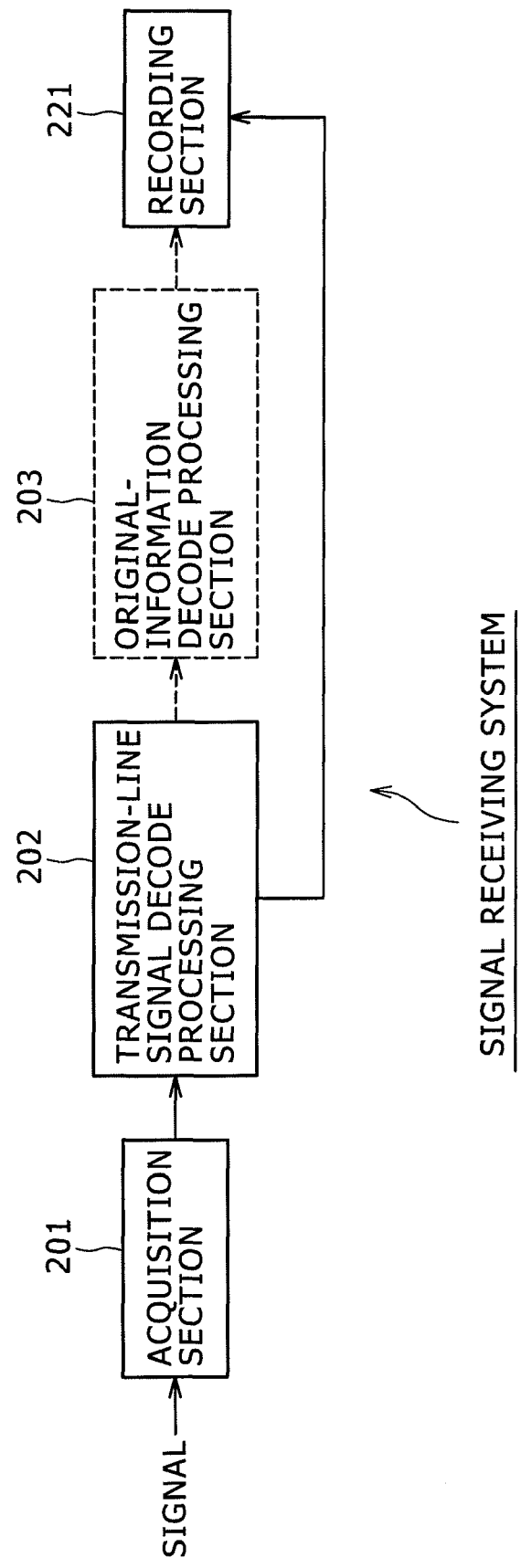
FIG. 17 is a block diagram showing a typical configuration of a signal receiving system according to a third embodiment of the present invention.

FIG. 17 is a block diagram showing a typical configuration of a signal receiving system according to a third embodiment of the present invention.

In the typical configuration of the third embodiment implementing a signal receiving system as shown in the block diagram of FIG. 17, components identical with their respective counterparts employed in the typical configuration of the first embodiment implementing a signal receiving system as shown in the block diagram of FIG. 15 are denoted by the same reference numerals as the respective counterparts.

The third embodiment implementing a signal receiving system as shown in the block diagram of FIG. 17 also employs an acquisition section 201 and a transmission-line signal decode processing section 202 in the same way as the first embodiment implementing a signal receiving system as shown in the block diagram of FIG. 15.

The third embodiment implementing a signal receiving system as shown in the block diagram of FIG. 17 is different from the first embodiment implementing a signal receiving system as shown in the block diagram of FIG. 15, however, in that the third embodiment does not employ an original-information decode processing section 203 but is newly provided with a recording section 221.

The recording section 221 is a section for recording (or storing) a signal output by the transmission-line signal decode processing section 202 into a recording (or storing) medium such as an optical disc, a hard disc (or a magnetic disc) or a flash memory.

The signal receiving system having the configuration like the one shown in the block diagram of FIG. 17 is applied to a recorder used for recording TV broadcasts.

It is to be noted that the signal receiving system having the configuration like the one shown in the block diagram of FIG. 17 may also employ an original-information decode processing section 203 for carrying out the original-information decode processing in order to generate a decoded signal which is then recorded onto the recording section 221. The decoded signal represents data of images and data of sounds.

As described above, the present embodiment is applied to a signal receiving apparatus for receiving OFDM signals transmitted from signal transmitting apparatus by making use of the MISO method adopted in the DVB-T.2 standards. It is to be noted, however, that the present embodiment can also be applied to other signal receiving apparatus. To put it more concretely, the present embodiment can also be applied to any other signal receiving apparatus as long as the other signal receiving apparatus is compatible with the signal receiving apparatus for receiving signals transmitted from signal transmitting apparatus by making use of the MISO method.

The series of processes described previously can be carried out by making use of hardware and/or by execution of software. If the series of processes described above is carried out by execution of software, programs composing the software can be installed into a computer embedded in dedicated hardware, a general-purpose personal computer or the like from for example a network or a removable recording medium. In this case, the computer embedded in dedicated hardware or the personal computer serves as the signal receiving apparatus described above. A general-purpose personal computer is a personal computer which can be made capable of carrying out a variety of functions by installing a variety of programs into the personal computer. In the following description, both the computer embedded in dedicated hardware and the personal computer are referred to simply as a computer.

Figure 18:
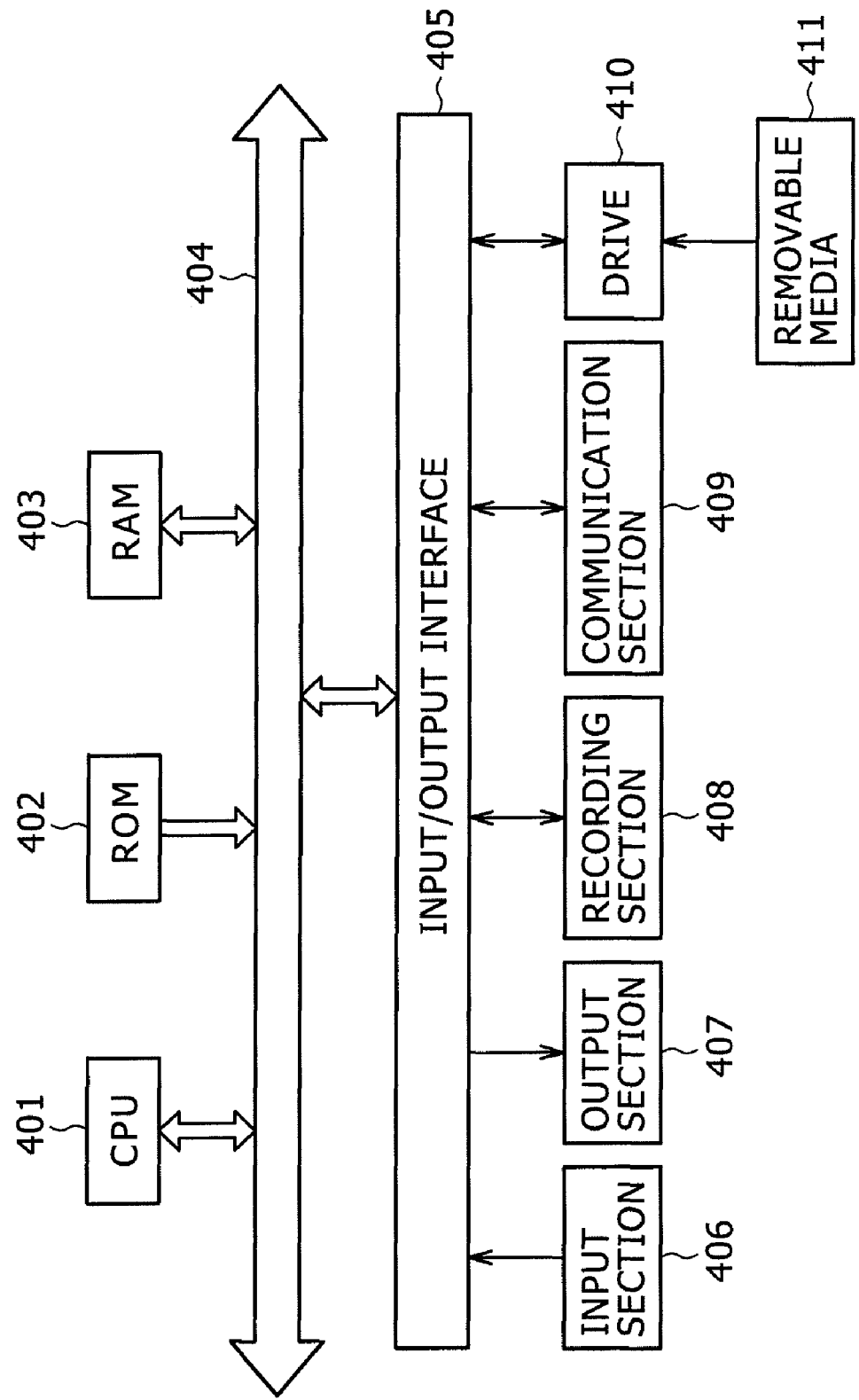
FIG. 18 is a block diagram showing a typical configuration of hardware of a computer.

FIG. 18 is a block diagram showing a typical configuration of hardware of a computer for executing the programs described above in order to carry out the series of processes.

In the computer shown in FIG. 18, a CPU (Central Processing Unit) 401 carries out various kinds of processing by execution of the aforementioned programs stored in advance in a ROM (Read Only Memory) 402 or loaded into a RAM (Random Access Memory) 403. The RAM 403 is a memory also used for properly storing various kinds of information such as data demanded in execution of the processing. The CPU 401, the ROM 402 and the RAM 403 are connected to each other by a bus 404.

The bus 404 is also connected to an input/output interface 405 which is wired to an input section 406, an output section 407, a recording section 408, a communication section 409 and a drive 410.

The input section 406 includes a keyboard, a mouse and a microphone whereas the output section 407 includes a display unit and a speaker. The recording section 408 is for example a hard disk or a non-volatile memory. The communication section 409 is an interface unit for carrying out communications with other apparatus through a network not shown in the figure. A removable recording medium 411 is mounted on the drive 410 to be driven by the drive 410. Examples of the removable recording medium 411 are a magnetic disc, an optical disc, an opto-magnetic disc and a semiconductor memory.

In the computer having the configuration shown in FIG. 18, in order to carry out the series of processes, the CPU 401 carries out various kinds of processing by execution of programs stored in advance in the ROM 402 or programs loaded from the recording section 408 into the RAM 403 through the input/output interface 405 and the bus 404. The programs loaded from the recording section 408 are programs already installed in the recording section 408 from the removable recording medium 411 mounted on the drive 410.

The aforementioned removable recording medium 411 for recording programs to be installed into the computer as programs to be executed by the CPU 401 is a removable recording medium provided to the user separately from the main unit of the computer shown in the block diagram of FIG. 18. In this case, the programs are presented to the user as programs stored in the removable recording medium 411 which serves a package medium. As an alternative, the programs to be installed into the computer are downloaded into the computer from a program provider by making use of a wire or radio communication medium. Typical examples of the wire communication medium are a local area network or the Internet whereas a typical example of the radio communication medium is a digital broadcasting communication medium.

The programs are installed in the computer as follows. In the computer shown in the block diagram of FIG. 18, by mounting the removable recording medium 411 onto the drive 410, the programs recorded in advance on the removable recording medium 411 are installed in the recording section 408 by way of the input/output interface 405. On the other hand, the programs downloaded into the computer from a program provider by making use of a wire or radio communication medium as programs to be installed into the computer are received by the communication section 409 and stored in the recording section 408.

As an alternative, the programs can be stored in the ROM 402 or the recording section 408 in advance instead of installing the programs in the computer as described above.

It is also worth noting that, in the specifications of the present embodiment, the programs include not only programs executed by the computer in order to carry out steps of the flowchart described above in a pre-prescribed order along the time axis, but also programs which are concurrently or individually executed with demanded timings such timings to activate the steps.

In addition, it should be understood by those skilled in the art that a variety of modifications, combinations, sub-combinations and alterations may occur, depending on design requirements and other factors as far as they are within the scope of the appended claims or the equivalents thereof.

The present application contains subject matter related to that disclosed in Japanese Priority Patent Application JP 2009-134666 filed in the Japan Patent Office on Jun. 4, 2009, the entire content of which is hereby incorporated by reference.

What is claimed is:

1. A signal receiving apparatus comprising:
    acquisition means for acquiring an Orthogonal Frequency Division Multiplexing signal resulting from combination of a plurality of signals transmitted by a plurality of signal transmitting apparatus by adoption of an Orthogonal Frequency Division Multiplexing method; and
    demodulation means for carrying out partial processing of processing to demodulate said Orthogonal Frequency Division Multiplexing signal acquired by said acquisition means by making use of either first pilot signals or second pilot signals where
    said first pilot signals are pilot signals extracted from said Orthogonal Frequency Division Multiplexing signal acquired by said acquisition means as signals having a same phase for all said signal transmitting apparatus,
    said second pilot signals are pilot signals extracted from said Orthogonal Frequency Division Multiplexing signal acquired by said acquisition means as signals having different phases depending on said signal transmitting apparatus, and
    wherein said demodulation means has filter center-position search means for carrying out said partial processing of said processing to demodulate said Orthogonal Frequency Division Multiplexing signal by performing processing to find a center position of a frequency interpolation filter.

2. The signal receiving apparatus according to claim 1 wherein said second pilot signals are pilot signals with phases reversed to each other among a plurality of signal transmitting apparatus.

3. The signal receiving apparatus according to claim 2 wherein said demodulation means carries out said partial processing of said processing to demodulate said Orthogonal Frequency Division Multiplexing signal by making use of said first pilot signals.

4. The signal receiving apparatus according to claim 3 wherein said demodulation means has symbol synchronization means for carrying out said partial processing of said processing to demodulate said Orthogonal Frequency Division Multiplexing signal acquired by said acquisition means by performing processing to find a trigger position of a Fast Fourier Transform calculation to be executed on a specific signal included in a predetermined segment of said Orthogonal Frequency Division Multiplexing.

5. The signal receiving apparatus according to claim 3 wherein said demodulation means has equalization means for carrying out said partial processing of said processing to demodulate said Orthogonal Frequency Division Multiplexing signal acquired by said acquisition means by performing equalization processing on said Orthogonal. Frequency Division Multiplexing signal by making use of said first and second pilot signals.

6. A signal receiving method having the step of driving a signal receiving apparatus to:
    acquire an Orthogonal Frequency Division Multiplexing signal resulting from combination of a plurality of signals transmitted by a plurality of signal transmitting apparatus by adoption of an Orthogonal Frequency Division Multiplexing method; and
    carry out partial processing of processing to demodulate said Orthogonal Frequency Division Multiplexing signal acquired by said signal receiving apparatus by making use of either first pilot signals or second pilot signals where
    said first pilot signals are pilot signals extracted from said Orthogonal Frequency Division Multiplexing signal acquired by said signal receiving apparatus as signals having a same phase for all said signal transmitting apparatus,
    said second pilot signals are pilot signals extracted from said Orthogonal Frequency Division Multiplexing signal acquired by said signal receiving apparatus as signals having different phases depending on said signal transmitting apparatus,
    wherein said step for carrying out said partial processing of said processing to demodulate said Orthogonal Frequency Division Multiplexing signal includes performing processing to find a center position of a frequency-interpolation filter by a filter center-position search means.

7. A signal receiving program embodied on a non-transitory computer readable medium to be executed by a computer to perform a method comprising:
acquisition step for acquiring an Orthogonal Frequency Division Multiplexing signal resulting from combination of a plurality of signals transmitted by a plurality of signal transmitting apparatus by adoption of an Orthogonal Frequency Division Multiplexing method; and
demodulation step for carrying out partial processing of processing to demodulate said Orthogonal Frequency Division Multiplexing signal acquired by said acquisition step by making use of either first pilot signals or second pilot signals where
said first pilot signals are pilot signals extracted from said Orthogonal Frequency Division Multiplexing signal acquired by said acquisition step as signals having a same phase for all said signal transmitting apparatus,
said second pilot signals are pilot signals extracted from said Orthogonal Frequency Division Multiplexing signal acquired by said acquisition step as signals having different phases depending on said signal transmitting apparatus, and
wherein said demodulation step has filter center-position searching step for carrying out said partial processing of said processing to demodulate said Orthogonal Frequency Division Multiplexing signal by performing processing to find a center position of a frequency interpolation filter.

8. A signal receiving system comprising:
acquisition means for acquiring a signal arriving through a transmission line; and
a transmission-line signal decode processing section configured to carry out transmission-line signal decode processing including at least demodulation processing executed on said signal acquired by said acquisition means through said transmission line;
wherein
said signal acquired by said acquisition means through said transmission line is an Orthogonal Frequency Division Multiplexing signal resulting from combination of a plurality of signals transmitted by a plurality of signal transmitting apparatus by adoption of an Orthogonal Frequency Division Multiplexing method through a plurality of said transmission lines,
said transmission-line signal decode processing section employs demodulation means for carrying out partial processing of said demodulation processing to demodulate said Orthogonal Frequency Division Multiplexing signal acquired by said acquisition means through said transmission lines by making use of either first pilot signals or second pilot signals,
said first pilot signals are pilot signals extracted from said Orthogonal Frequency Division Multiplexing signal acquired by said acquisition means as signals having a same phase for all said signal transmitting apparatus,
said second pilot signals are pilot signals extracted from said Orthogonal Frequency Division Multiplexing signal acquired by said acquisition means as signals having, different phases depending on said signal transmitting apparatus, and
wherein said demodulation means has filter center-position search means for carrying out said partial processing of said processing to demodulate said Orthogonal Frequency Division Multiplexing signal by performing processing to find a center position of a frequency-interpolation filter.

9. A signal receiving system comprising:
a transmission-line signal decode processing section configured to carry out transmission-line signal decode processing including at least demodulation processing executed on a signal acquired through a transmission line; and
an original-information decode processing section configured to carry out original-information decode processing including at least processing to decompress compressed information into original information for said signal acquired through said transmission line signal decode processing;
wherein
said signal acquired by an acquisition means through said transmission line is an Orthogonal Frequency Division Multiplexing signal resulting from combination of a plurality of signals transmitted by a plurality of signal transmitting apparatus by adoption of an Orthogonal Frequency Division Multiplexing method through a plurality of said transmission lines,
said transmission-line signal decode processing section employs demodulation means for carrying out partial processing of said demodulation processing to demodulate said Orthogonal Frequency Division Multiplexing signal acquired through said transmission lines by making use of either first pilot signals or second pilot signals,
said first pilot signals are pilot signals extracted from said Orthogonal Frequency Division Multiplexing signal acquired by said acquisition means as signals having same phase for all said signal transmitting apparatus,
said second pilot signals are pilot signals extracted from said Orthogonal Frequency Division Multiplexing signal acquired by said acquisition means as signals having different phases depending on said signal transmitting apparatus, and
wherein said demodulation means has filter center-position search means for carrying out said partial processing of said processing to demodulate said Orthogonal Frequency Division Multiplexing signal by performing processing to find a center position of a frequency-interpolation filter.

10. A signal receiving system comprising:
a transmission-line signal decode processing section configured to carry out transmission-line signal decode processing including at least demodulation processing executed on a signal acquired through a transmission line; and
an output section configured to output an image or a sound on the basis of a signal obtained as a result of said transmission-line signal decode processing;
wherein
said signal acquired by an acquisition means through said transmission line is an Orthogonal Frequency Division Multiplexing signal resulting from combination of a plurality of signals transmitted by a plurality of signal transmitting apparatus by adoption of an Orthogonal Frequency Division Multiplexing method through a plurality of said transmission lines,
said transmission-line signal decode processing section employs demodulation means for carrying out partial processing of said demodulation processing to demodulate said Orthogonal Frequency Division Multiplexing signal acquired through said transmission lines by making use of either first pilot signals or second pilot signals, said first pilot signals are pilot signals extracted from said Orthogonal Frequency Division Multiplexing signal acquired by said acquisition means as signals having a same phase for all said signal transmitting apparatus, said second pilot signals are pilot signals extracted from said Orthogonal Frequency Division Multiplexing signal acquired by said acquisition means as signals having different phases depending on said signal transmitting apparatus, and wherein said demodulation means has filter center-position search means for carrying out said partial processing of said processing to demodulate said Orthogonal Frequency Division Multiplexing signal by performing processing to find a center position of a frequency interpolation filter.

11. A signal receiving system comprising:

a transmission-line signal decode processing section configured to carry out transmission line signal decode processing including at least demodulation processing executed on a signal acquired through a transmission line; and a recording section used for recording a signal obtained as a result of said transmission-line signal decode processing;

wherein said signal acquired by an acquisition means through said transmission line is an Orthogonal Frequency Division Multiplexing signal resulting from combination of a plurality of signals transmitted by a plurality of signal transmitting apparatus by adoption of an Orthogonal Frequency Division Multiplexing method through a plurality of said transmission lines, said transmission-line signal decode processing section employs demodulation means for carrying out partial processing of said demodulation processing to demodulate said Orthogonal Frequency Division Multiplexing signal acquired through said transmission lines by making use of either first pilot signals or second pilot signals, said first pilot signals are pilot signals extracted from said Orthogonal Frequency Division Multiplexing signal acquired by said acquisition means as signals having a same phase for all said signal transmitting apparatus, said second pilot signals are pilot signals extracted from said Orthogonal Frequency Division Multiplexing signal acquired by said acquisition means as signals having different phases depending on said signal transmitting apparatus, and wherein said demodulation means has filter center-position search means for carrying out said partial processing of said processing to demodulate said Orthogonal Frequency Division Multiplexing signal by performing processing to find a center position of a frequency-interpolation filter.

12. A signal receiving apparatus comprising:

an acquisition section, including at least a tuner, configured to acquire an Orthogonal Frequency Division Multiplexing signal resulting from combination of a plurality of signals transmitted by a plurality of signal transmitting apparatus by adoption of an Orthogonal Frequency Division Multiplexing method; and a demodulation section configured to carry out partial processing of processing to demodulate said Orthogonal Frequency Division Multiplexing signal acquired by said acquisition section by making use of either first pilot signals or second pilot signals where said first pilot signals are pilot signals extracted from said Orthogonal Frequency Division Multiplexing signal acquired by said acquisition section as signals having a same phase for all said signal transmitting apparatus, said second pilot signals are pilot signals extracted from said Orthogonal Frequency Division Multiplexing signal acquired by said acquisition section as signals having different phases depending on said signal transmitting apparatus, and wherein said demodulation section has filter center-position search section configured to carry out said partial processing of said processing to demodulate said Orthogonal Frequency Division Multiplexing signal by performing processing to find a center position of a frequency interpolation filter.

* * * * *